US012095582B2

(12) United States Patent
Baker

(10) Patent No.: US 12,095,582 B2
(45) Date of Patent: Sep. 17, 2024

(54) LATENCY COMPENSATION FOR SYNCHRONOUSLY SHARING VIDEO CONTENT WITHIN WEB CONFERENCING SESSIONS

(71) Applicant: MICROSOFT TECHNOLOGY LICENSING, LLC, Redmond, WA (US)

(72) Inventor: Casey James Baker, Bellingham, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/785,523

(22) Filed: Feb. 7, 2020

(65) Prior Publication Data

US 2021/0250195 A1  Aug. 12, 2021

(51) Int. Cl.
*H04L 12/18* (2006.01)
*H04L 43/0829* (2022.01)
(Continued)

(52) U.S. Cl.
CPC ...... *H04L 12/1827* (2013.01); *H04L 12/1831* (2013.01); *H04L 43/0841* (2013.01);
(Continued)

(58) Field of Classification Search
CPC ............. H04L 12/1827; H04L 12/1831; H04L 43/0841; H04L 43/0864; H04L 65/4015; H04L 65/403; H04L 65/80
See application file for complete search history.

(56) References Cited

U.S. PATENT DOCUMENTS 5,820,463 A   10/1998  O'Callaghan
7,085,842 B2   8/2006  Reid et al.
(Continued)

FOREIGN PATENT DOCUMENTS

CN    103190092 A   7/2013
CN    103839558 B   6/2014
(Continued)

OTHER PUBLICATIONS

"Choose Live Encoder Settings, Bitrates, and Resolutions", Retrieved from: https://web.archive.org/web/20190711045317/https:/support.google.com/youtube/answer/2853702?hl=en&ref_topic=9257892, Jul. 11, 2019, 5 Pages.
(Continued)

*Primary Examiner* — William G Trost, IV
*Assistant Examiner* — Abdelbasst Talioua
(74) *Attorney, Agent, or Firm* — Newport IP, LLC; Jacob P. Rohwer

(57) ABSTRACT

A system to perform latency compensation techniques to facilitate synchronous sharing of video content during a communication session. The system enables video content that is being shared during the communication session to be played synchronously across numerous different client devices that are being used to participate in the communication session, notwithstanding variations in networking latency associated with the different client devices. The disclosed technologies provide improvements over existing screen sharing techniques which include continuously uploading streams of shared media content from a sharer's device and distributing these uploaded streams to other devices. For example, the techniques described herein enable a system to facilitate sharing of video content during a communication session without initially rendering video content at and simultaneously uploading the rendered video (Continued)

content from a sharer's device. Furthermore, the techniques described herein include latency compensation to accommodate for variations in network latency experienced across numerous different client devices.

14 Claims, 16 Drawing Sheets

(51) Int. Cl.
  *H04L 43/0864* (2022.01)
  *H04L 65/401* (2022.01)
  *H04L 65/403* (2022.01)
  *H04L 65/80* (2022.01)

(52) U.S. Cl.
  CPC ...... *H04L 43/0864* (2013.01); *H04L 65/4015* (2013.01); *H04L 65/403* (2013.01); *H04L 65/80* (2013.01)

(56) References Cited

U.S. PATENT DOCUMENTS

| | | | |
|---|---|---|---|
| 7,725,593 B2 | 5/2010 | Visharam et al. | |
| 7,996,566 B1 | 8/2011 | Sylvain et al. | |
| 8,621,352 B2 | 12/2013 | Ding et al. | |
| 9,185,149 B2 | 11/2015 | Spencer | |
| 9,258,524 B2 | 2/2016 | DeLuca et al. | |
| 9,300,696 B2 | 3/2016 | Kim et al. | |
| 9,549,027 B2 | 1/2017 | Ali et al. | |
| 10,150,030 B2 | 12/2018 | Perlman et al. | |
| 10,333,999 B2 | 6/2019 | Shamma | |
| 10,431,187 B2* | 10/2019 | Miki | H04L 65/4015 |
| 2003/0088875 A1 | 5/2003 | Gay et al. | |
| 2003/0126211 A1 | 7/2003 | Anttila et al. | |
| 2009/0327425 A1* | 12/2009 | Gudipaty | H04N 7/147 |
| | | | 709/205 |
| 2012/0042047 A1* | 2/2012 | Chen | H04N 21/4305 |
| | | | 709/219 |
| 2012/0133727 A1 | 5/2012 | Bolduc et al. | |
| 2013/0103770 A1 | 4/2013 | Kamolz et al. | |
| 2014/0323036 A1* | 10/2014 | Daley | H04H 20/38 |
| | | | 455/3.06 |
| 2014/0337734 A1* | 11/2014 | Bradford | G09B 5/00 |
| | | | 715/719 |
| 2015/0179227 A1 | 6/2015 | Russell | |
| 2015/0355879 A1* | 12/2015 | Beckhardt | H04L 65/61 |
| | | | 700/94 |
| 2015/0373072 A1* | 12/2015 | Moricca | H04L 65/611 |
| | | | 709/219 |
| 2016/0088050 A1 | 3/2016 | Einarsson | |
| 2016/0103572 A1* | 4/2016 | Joffray | H04N 21/6587 |
| | | | 715/738 |
| 2016/0171825 A1* | 6/2016 | Morrow | G07F 17/3223 |
| | | | 463/42 |
| 2016/0179293 A1* | 6/2016 | Girgensohn | G11B 27/34 |
| | | | 715/719 |
| 2017/0273044 A1 | 9/2017 | Alsina et al. | |
| 2017/0289609 A1* | 10/2017 | Liu | H04N 21/4394 |
| 2017/0374425 A1 | 12/2017 | Disley et al. | |
| 2018/0221774 A1 | 8/2018 | Sullivan et al. | |
| 2018/0317191 A1 | 11/2018 | Daley et al. | |
| 2019/0045471 A1* | 2/2019 | Keyser-Allen | H04N 21/4392 |
| 2019/0075171 A1* | 3/2019 | Childress | H04L 67/01 |
| 2019/0238911 A1 | 8/2019 | Slutsky et al. | |
| 2020/0029117 A1 | 1/2020 | Kalva et al. | |
| 2021/0099759 A1* | 4/2021 | Armstrong | H04N 21/6582 |

FOREIGN PATENT DOCUMENTS

| | | |
|---|---|---|
| CN | 105493422 A | 4/2016 |
| CN | 109168059 A | 1/2019 |
| CN | 109906593 A | 6/2019 |
| EP | 2144439 A1 | 1/2010 |
| WO | 2018006573 A1 | 1/2018 |
| WO | 2018006574 A1 | 1/2018 |
| WO | 2018037415 A1 | 3/2018 |

OTHER PUBLICATIONS

"Group Collaboration", Retrieved from: https://www.bluejeans.com/features/group-collaboration, Retrieved Date: Aug. 13, 2019, 7 Pages.

"How Do I Stream a Video File in a Cisco Webex Meetings?", Retrieved from: https://help.webex.com/en-us/WBX54808/How-Do-I-Stream-a-Video-File-in-a-Cisco-Webex-Meetings, Retrieved Date: Jul. 18, 2019, 2 Pages.

"Introduction to Ethernet Latency", In Journal of QLogic Corporation, Retrieved Date: Aug. 13, 2019, pp. 1-5.

"Play a video in a Skype for Business meeting", Retrieved from: https://support.office.com/en-gb/article/play-a-video-in-a-skype-for-business-meeting-1bb30e51-d8f9-4ef6-b018-b170439e7488, Retrieved Date: Jul. 18, 2019, 6 Pages.

"Share Pre-Recorded Video Clips During Your Webinar", Retrieved from: https://web.archive.org/web/20130929205001/https:/www.readytalk.com/products-services/web-conferencing/features/video-clip-playback, Sep. 29, 2013, 2 Pages.

Croes, Mark, "Performance Analysis of Virtualized Video Streaming Service", In Thesis of University of Amsterdam, Jun. 8, 2017, 46 Pages.

Gutelle, Sam, "YouTube Lets Users Live Stream at 60 Frames per Second", Retrieved from: https://www.tubefilter.com/2015/05/21/youtube-live-stream-60-frames-per-second/, May 21, 2015, 10 Pages.

Hoyos-Rivera, et al., "Collaborative Web Browsing Tool Supporting Audio/Video Interactive Presentations", In Proceedings of the 14th IEEE International Workshops on Enabling Technologies: Infrastructure for Collaborative Enterprise, Jun. 13, 2005, 6 Pages.

Huang, et al., "LIFO-Backpressure Achieves Near Optimal Utility-Delay Tradeoff", In Journal of IEEE/ACM Transactions on Networking, vol. 21, Issue 3, Nov. 12, 2012, pp. 1-10.

Jain, et al., "Vlc_sync", Retrieved from: https://web.archive.org/web/20180610233828/https:/github.com/opcode81/vlc_sync, Jun. 10, 2018, 5 Pages.

"International Search Report and Written Opinion Issued in PCT Application No. PCT/US21/014036", Mailed Date: May 7, 2021, 21 Pages.

Notification of First Office Action Received for Chinese Application No. 202180012997.0, mailed on Jun. 28, 2024, 29 pages. (English Translation Provided).

First Examination Report Received for Indian Application No. 202247050512, mailed on Jul. 3, 2024, 06 pages.

* cited by examiner

LATENCY COMPENSATION FOR SYNCHRONOUSLY SHARING VIDEO CONTENT WITHIN WEB CONFERENCING SESSIONS

BACKGROUND

Modern web conference systems facilitate virtual meetings that are conducted online between people whom are remote from one another. In general, web conference systems allow users, in two or more remote locations, to communicate interactively with each other via live, simultaneous two-way video streams, audio streams, or both. Some web conference systems (e.g., CISCO WEBEX provided by CISCO SYSTEMS, Inc. of San Jose, CA, GOTOMEETING provided by CITRIX SYSTEMS, INC. of Santa Clara, CA, ZOOM provided by ZOOM VIDEO COMMUNICATIONS of San Jose, CA, GOOGLE HANGOUTS by ALPHABET INC. of Mountain View, CA, and TEAMS MEETINGS provided by the MICROSOFT CORPORATION, of Redmond, WA) also facilitate screen sharing. In this way, a participant of an internet-based communication session can share video (and any other media content) that is being played locally on a display screen of a client device.

Unfortunately, conventional screen sharing techniques that are utilized by modern web conference systems are ill-suited for sharing video content at full resolution and framerate. For example, these techniques typically require videos to be fully processed and rendered at a sharer's device before being transmitted in an upload stream to a web conference server. The uploaded video content is then transmitted from the web conference server to other devices in a download stream. Thus, in these techniques the video content does not become available for download until it has been both rendered on the sharer's device and uploaded to the web conference server.

One major drawback of these conventional screen sharing techniques (e.g., which rely on a real-time upload and download of the video content as it is being rendered at a sharer's device) is that the web conferencing system cannot facilitate buffering of any upcoming portion of the video content. Another major drawback is that networking limitations often require the resolution and framerate of the video content to be reduced prior to being added to the upload stream. As a specific example, a video being rendered at 60 frames-per-second at a sharer's device may be reduced to a mere 5 frames-per-second prior to being uploaded to the web conferencing server and then distributed to other client devices. One reason for reducing the framerate and/or resolution is that upload speeds are frequently substantially less than download speeds on a typical network. Furthermore, even at a reduced resolution and framerate, networking latency frequently prevents the shared video content from being rendered synchronously across the various participants' computing devices. For example, the shared video content may be inadvertently played at different playhead positions at different client devices due to the differences in time that it takes for the steamed video content to be transmitted to the different devices.

It is with respect to these and other considerations that the following disclosure is made.

SUMMARY

The techniques disclosed herein enable a system to perform latency compensation techniques to facilitate synchronous sharing of video content during a communication session. Stated plainly, the system enables video content that is being shared during the communication session to be played synchronously across numerous different client devices that are being used to participate in the communication session, not withstanding variations in networking latency associated with the numerous different client devices. The disclosed technologies provide improvements over existing screen sharing techniques which include continuously uploading streams of shared media content from a sharer's device and distributing these uploaded streams to other devices. For example, the techniques described herein enable a system to facilitate sharing of video content during a communication session without initially rendering video content at and simultaneously uploading the rendered video content from a sharer's device. Furthermore, the techniques described herein include latency compensation to accommodate for variations in network latency experienced across numerous different client devices.

Thus, the techniques described herein lessen, or even wholly eliminate, any disparity in the playhead position at which shared video content is played across the various different client devices being used to participate in the communication session. Furthermore, as described below, various embodiments of the techniques described herein enable individual client devices to independently buffer the shared video content, thereby enabling shared video content to be synchronously played across the various client devices at an intended full video resolution and framerate (e.g., by eliminating the reliance on the real-time upload stream of the video content from the sharer's device). For at least the foregoing reasons, the technologies described herein provide the technical benefit of improving the networking efficiency with which computing devices share media content during web-based communication sessions (e.g., virtual meetings). For example, such techniques can increase the networking efficiency by eliminating the reliance on video content being simultaneously rendered and uploaded from a sharer's device prior to being distributed to other participants' devices. Thus, the usage of various computing resources such as network resources, memory resources, processing resources, and power resources (e.g., "battery") can be significantly reduced during a communication session by deploying the techniques described herein.

In an exemplary implementation, a system facilitates a communication session (e.g., a virtual meeting or web-based conference) by transmitting bi-directional user streams between a plurality of client devices. For example, individual ones of the client devices may continuously capture audio and video "AV" data (e.g., of a user) via various input devices such as cameras and microphones. The captured A/V data may be continuously streamed to a server device(s). Upon receiving the AV data streams, the server device(s) transmit to each individual client device the streams of A/V data that is received from each other client device. In this way, each individual client device is enabled to render live video of the participants utilizing the other client devices.

In addition to facilitating the communication session, the system obtains media data that defines media content to be concurrently played across the client devices during the communication session. For example, a user may upload a video to the server device(s) during and/or prior to the communication session. Then, at some point during the communication session while the client devices are rendering the live video or simply audio streams that are captured at the other participants' client devices, the video hosted by the server device(s) may be streamed to and displayed at the client devices.

During the communication session, the system receives a user play instruction that is generated based on user input being received at a particular client device for the purpose of initiating playback of the video across all of the client devices. For example, a user at the particular client device may select the video and may even adjust the playhead position of the video to a desired playhead position. Then, the user may select a "play" or "share" command in association with the video to cause all of the other client devices to begin playback of the video at the desired playhead position.

The system also determines latency values for individual ones of the client devices. Specifically, the latency data defines individual latency values associated with transmitting information to individual client devices. For example, a latency value of 54 milliseconds for a particular client device indicates that it will take 54 milliseconds for information that is sent to that particular client device to be transmitted across one or more networks and, ultimately, to reach that particular client device. Determining the latency values for the client devices may include periodically pinging the individual client devices and measuring an amount of time that it takes for the pings to be returned to (e.g., echoed back to) the sending device from the receiving device. For example, assuming that each leg of these individual round-trips are equal in time, the latency value associated with any individual client device may be assumed to be the measured round-trip time divided in half.

Ultimately, the system may respond to the user play instruction by transmitting, to the client devices, latency play instructions that include the custom latency values for the individual client devices. For example, the individual latency play instructions may include a latency delay value that prescribes an amount of time that each receiving client device is to wait (i.e., after receiving an instruction) before initiating playback of the video. In this way, all of the devices may be caused to wait an appropriate amount of time so that even the device experiencing the highest networking latency will receive its instruction. Then, all devices can synchronously or simultaneously being playing the video.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
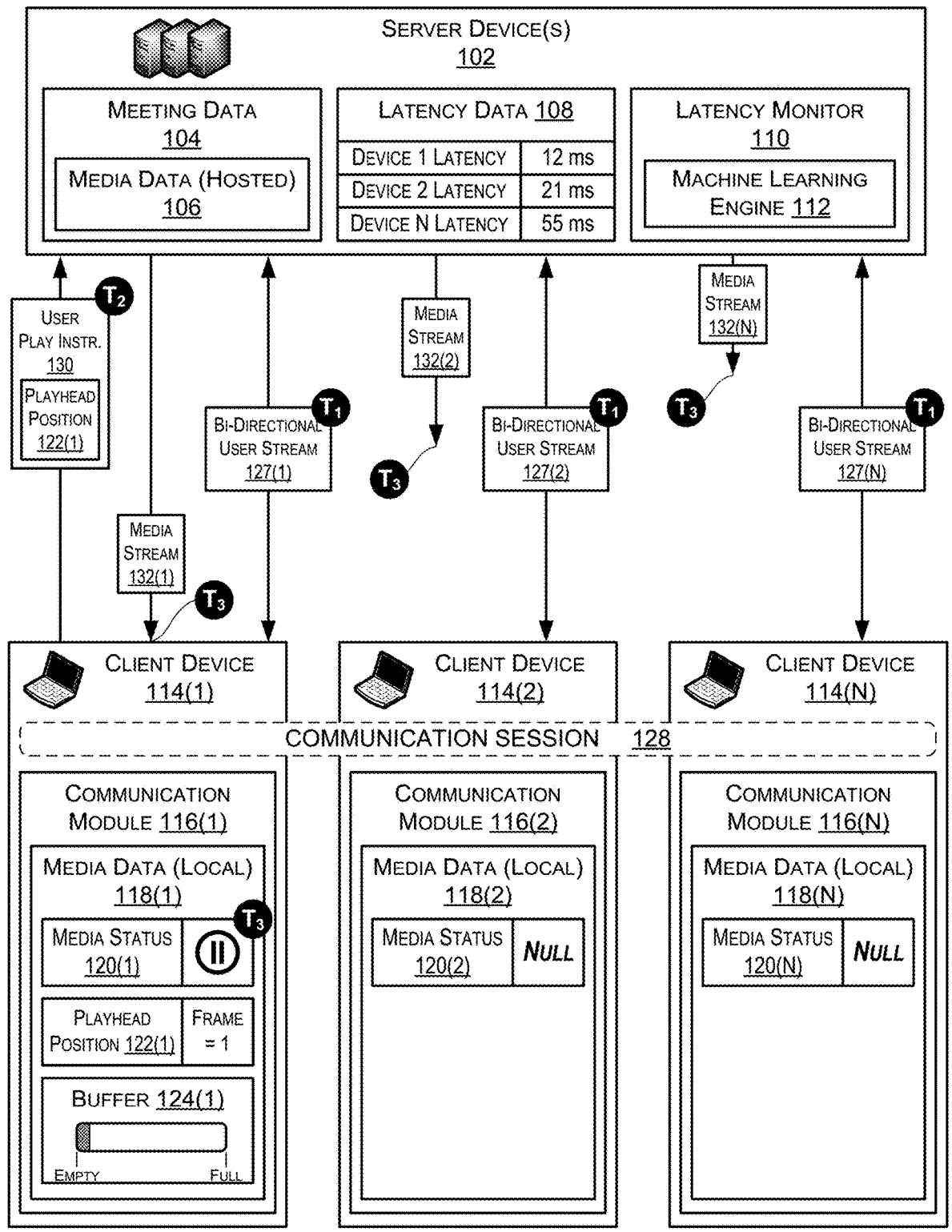
FIG. 1A illustrates an exemplary scenario for a system to perform latency compensation techniques to facilitate synchronous sharing of video content across a plurality of client devices during a communication session.

FIG. 1A illustrates an exemplary scenario for a system 100 to perform latency compensation techniques to facilitate synchronous sharing of video content during a communication session 128. Stated plainly, the system 100 enables video content that is being shared during the communication session 128 to be played synchronously (e.g., at substantially the same playhead position 122) across numerous different client devices 114 that are being used to participate in the communication session 128. The technologies disclosed herein with respect to the system 100 provide improvements over existing screen sharing techniques which require video content to be initially processed and rendered at an individual client device while being simultaneously uploaded to a web conference server for distribution to one or more other client devices (at which the video content will ultimately be rendered with some network latency caused delay). For example, as described above, existing screen sharing techniques attempt to mitigate the effects of network latency by reducing the resolution and/or framerate of rendered video content prior to uploading that rendered video content to the web conference server. In this way, the bit rate of the data stream that is being uploaded for sharing the video content is reduced which partially reduces the delay between playhead positions of the video content across devices. Unfortunately, even reducing the resolution and/or framerate of the video content prior to being uploaded does not eliminate the requirement that video content be initially rendered at and then uploaded from a sharer's device prior to being distributed to other client devices. Since uploading video content from a sharer's device inherently requires some amount of time, existing screen sharing techniques cannot wholly eliminate delays in playhead positions that are caused by network induced latency. In contrast, the techniques described herein enable a system 100 to facilitate sharing of video content during a communication session 128 without initially rendering video content at and simultaneously uploading the rendered video content from a sharer's device. Furthermore, the techniques described herein include latency compensation to accommodate for variations in network latency experienced across numerous different client devices 114.

Thus, the techniques described herein lessen, or even wholly eliminate, any disparity in the playhead position 122 at which shared video content is played across the various client devices 114 being used to participate in the communication session 128. Furthermore, as described below, various embodiments of the techniques described herein enable individual client devices 114 to independently maintain some prefetched portion of the shared video content (e.g., either by pre-downloading the shared video content in its entirety or by maintaining a buffer of some upcoming portion of the shared video content), thereby enabling shared video content to be synchronously played across the various client devices 114 at an intended full video resolution and framerate (e.g., by eliminating the reliance on the real-time upload stream of the video content from the sharer's device). For at least the foregoing reasons, the technologies described herein provide the technical benefit of improving the networking efficiency with which computing devices share media content during web-based communication sessions (e.g., virtual meetings). For example, such techniques can increase the networking efficiency by eliminating the reliance on video content being simultaneously rendered and uploaded from a sharer's device prior to being distributed to other participants' devices. Thus, the usage of various computing resources such as network resources, memory resources, processing resources, and power resources (e.g., "battery") can be significantly reduced during a communication session by deploying the techniques described herein.

As illustrated in FIG. 1A, the system 100 may include one or more server devices 102 and one or more client devices 114 that perform the various operations described herein and/or store the various types of data described herein. With respect to the client devices 114, although illustrated in the form of laptop-style computing devices, the client devices 114 may be any suitable form such as, for example, a desktop computer, a smart phone, a smart watch, a smart television, and so on. In the illustrated embodiment, the server device(s) 102 may store (or otherwise have access to) meeting data 104 that defines aspects of a "web-based" communication session. For example, and without limitation, the meeting data 104 may include a list of invitees, a scheduled time at which the "web-based" communication session is to take place, and/or a link that enables a first client device 114(1) through an Nth client device 114(N) to utilize respective communication modules 116 to join the "web-based" communication session (e.g., as represented by the communication session 128 that spans across the first client device 114(1) through the Nth client device 114(N)). As illustrated, the meeting data 104 may further include media data 106 that is hosted on the server devices 102. The media data 106 may be video data (e.g., MPEG-4 Part 14 data, or any other suitable format) that is uploaded from one or more of the client devices 114 to the server devices 102 prior to and/or during the communication session 128. For example, an organizer of the communication session 128 may utilize the communication module 116 (e.g., MICROSOFT OUTLOOK, etc.) to generate a calendar object in association with the communication session 128. The calendar object may cause the communication session 128 to be added to the various invitees' electronic calendars while also providing access to the media data 106. As illustrated, the media data 106 may be hosted on the server devices 102. In some embodiments, the media data 106 includes video content (e.g., MPEG-4 Part 14 data) that is to be shared during the communication session 128. Additionally, or alternatively, the media data 106 may include a link or pointer to video content that is hosted externally to the server devices 102. For example, the media data 106 may include a link to an online video that is hosted by a third-party video hosting service (e.g., VIMEO, YOUTUBE, etc.).

In the illustrated embodiment, the server device(s) 102 further include latency data 108 that defines latency values in association with individual ones of the client devices 114. As used herein, the term "latency value" refers to an amount of time that is taken for information to be sent from a particular computing device (e.g., the server devices 102) over one or more networks to individual ones of the client devices 114. For example, an amount of time that it takes for information to be transmitted from one or more of the server devices 102 over one or more networks to the first client device 114(1) may aptly be referred to as a latency value of the first client device 114(1). For non-limiting illustrative purposes, the latency data 108 shown in FIG. 1A defines a first latency value of 12 milliseconds (ms) in association with the first client device 114(1), a second latency value of 21 milliseconds in association with the second client device 114(2), and an Nth latency value of 55 milliseconds in association with the Nth client device 114(N). Thus, under circumstances in which the latency values are measured in terms of time taken for data to be transmitted from the one or more server device 102 to the individual client devices 114, then information sent from the server devices 102 will take 12 milliseconds to reach the first client device 114(1), 21 milliseconds to reach the second client device 114(2), and so on.

In some embodiments, the server device(s) 102 are configured to deploy a latency monitor 110 to generate the latency data 108 in association with individual ones of the client devices 114. For example, during the communication session 128, the latency monitor 110 may periodically transmit information to individual client devices 114 and may measure an amount of time taken for a reply to be received from the individual client devices 114. It will be appreciated that this measured amount of time represents a round-trip time that it takes for data to be transmitted from the server devices 102 to a particular client device 114 and then returned from that particular client device 114 back to the server devices 102. Thus, assuming that each leg of this round-trip is equal in time, then the latency value associated with any individual client device 114 may be assumed to be the measured round-trip time divided in half. As described in more detail below, in some embodiments, the latency monitor 110 may deploy a machine learning engine 112 to analyze aspects of the latency data 108 (e.g., upward and/or downward trends in latency for individual client devices and/or groups of client devices) to refine the latency values associated with individual client devices 114.

Aspects of the exemplary scenario in which the system 100 performs latency compensation techniques to facilitate synchronous sharing of video content during a communication session 128 are described in FIGS. 1A through 1D with respect to a first time $T_1$ through a seventh time $T_7$. For purposes of the present discussion, these times represent a sequence of times in which: $T_1 < T_2 < T_3 < T_4 < T_5 < T_6 < T_7$ (where < means "prior to"). The sequence of events which are described to occur at individual times within the sequence of times are for illustrative purposes only. Various ones of these events may be omitted and/or re-ordered with respect to other ones of these events without departing from the scope of the described embodiments and appended claims.

At a first time $T_1$, the system 100 is communicating a plurality of bi-directional user streams 126 between the server devices 102 and the individual client devices 114 for the purpose of facilitating the communication session 128. Specifically, the system 100 is shown to be communicating a first bi-directional user stream 126(1) between the server devices 102 and the first client device 114(1), a second bi-directional user stream 126(2) between the server devices 102 and the second client device 114(2), and an Nth bi-directional user stream 126(N) between the server devices 102 and the Nth client device 114(N). As used herein, the term "stream" may refer to a substantially continuous flow of data (e.g., audio and video material) between different computing devices over one or more networks. For example, a continuous flow of video content from the server devices 102 to an individual client device 114 may aptly be referred to as a stream (also referred to as a "data stream"). As used herein, the term "bi-directional user stream" refers to a combination of: an upload stream that includes data captured by one or more input devices (e.g., microphones, video cameras, etc.) of a particular client device 114, and a download stream that includes data captured by input device(s) of at least one other client device 114.

For purposes of the present discussion, presume that each bi-directional user stream 126 illustrated in association with each individual client device 114 includes an upload stream having at least one of substantially real-time audio or substantially real-time video that is being captured at that individual client device 114. Furthermore, presume that each bi-directional user stream 126 illustrated in association with each individual client device 114 includes a download stream having at least one of substantially real-time audio or substantially real-time video that is being captured at one or more of the other client device 114 being used to participate in the communication session 128. For example, the first bi-directional user stream 126(1) may include an upload stream of real-time data that is being captured by a microphone and camera of the first client device 114(1) and a download stream of real-time data that is being captured by microphones and cameras at each of the second client device 114(2) and the Nth client device 114(N). It can be appreciated therefore that by communicating the bi-directional user streams 126, the system 100 may facilitate the communication session 128 as a type of "virtual" or "web-based" meeting or conference during which individual participants may be presented with audio and/or video of other participants while also having audio and/or video of themselves presented to those other participants. For purposes of the present discussion of FIGS. 1A through 1D, presume that the communication of the bi-directional user streams 126 continues from the first time $T_1$ through the seventh time $T_7$.

At a second time $T_2$, a user play instruction 130 is generated by the first client device 114(1) and transmitted therefrom to the server devices 102. The user play instruction 130 may be generated based on user input that is received at the first client 114(1) is association with the media data 106 (that is identified within the meeting data 104) to cause video content to be synchronously played at the first client device 114(1) through the Nth client device 114(N). As illustrated, the user play instruction 130 may include an indication of a first playhead position 112(1) at which the media data 106 is to begin playing. For example, the media data 106 may include (or point to) a sequence of frames that form video content when played (e.g., at a predefined framerate) and the user play instruction 130 may define a specific frame within this sequence at which the video content is to begin synchronously playing across the individual client devices 114. Additionally, or alternatively, the user play instruction 130 may define a specific time at which the video content is to begin synchronously playing across the individual client devices 114.

For purposes of the exemplary scenario illustrated in and described in relation to FIGS. 1A through 1D, presume that upon receiving the user play instruction 130 the server devices 102 begin transmitting individual media streams 132 to individual ones of the client devices 114. Specifically, the server devices 102 are shown to have responded to the user play instruction 130 by initiating transmissions of a first media stream 132(1) to the first client device 114(1), a second media stream 132(2) to the second client device 114(2), and an Nth media stream 114(N) to the Nth client device 114(N). As used herein, the term "media stream" may refer to a stream of the media data 106 (e.g., MP4 formatted audio/video content) from the server devices 102 to individual ones of the client devices 114. Thus, it can be appreciated that the media streams 132 may be unidirectional in nature (e.g., in contrast to being bi-directional in nature due to having both upload and download portions).

As described above, the amount of time that it takes for the individual media streams 132 to reach the corresponding client devices 114 varies due to latencies or delays that result inherently from transmitting data over one or more networks. As indicated by the latency data 108, for example, information being transmitted (e.g., over the internet) from the server devices 102 will take 12 milliseconds to reach the first client device 114(1), 21 milliseconds to reach the second client device 114(2), and 55 milliseconds to reach the Nth client device 114(N). Thus, assuming that the transmissions of the media streams 132 are initiated simultaneously, it may be expected that the first media stream 132(1) will reach the first client device 114(1) after a mere 12 milliseconds and prior to either of the second media stream 132(2) or the Nth media stream 132(N) reaching the second client device 114(2) or Nth client device 114(N), respectively.

Based on these networking latencies associated with the various client devices 114, at a third time $T_3$ the first media stream 132(1) is shown to have reached the first client device 114(1) whereas at this third time $T_3$ the second media stream 132(2) has yet to reach the second client device 114(2) and the Nth media stream 132(N) has yet to reach the Nth client device 114(N). As illustrated, upon receiving some initial portion of the first media stream 132(1), the first client device 114(1) is shown to have set a media status 120 of the video content to "pause" within the first communication module 116(1). Additionally, or alternatively, upon receiving the initial portion of the first media stream 132(1), the first client device 114(1) may establish a first buffer 124(1) of the video content (e.g., that is being received continuously via the first media stream 132(1)).

Figure 1B:
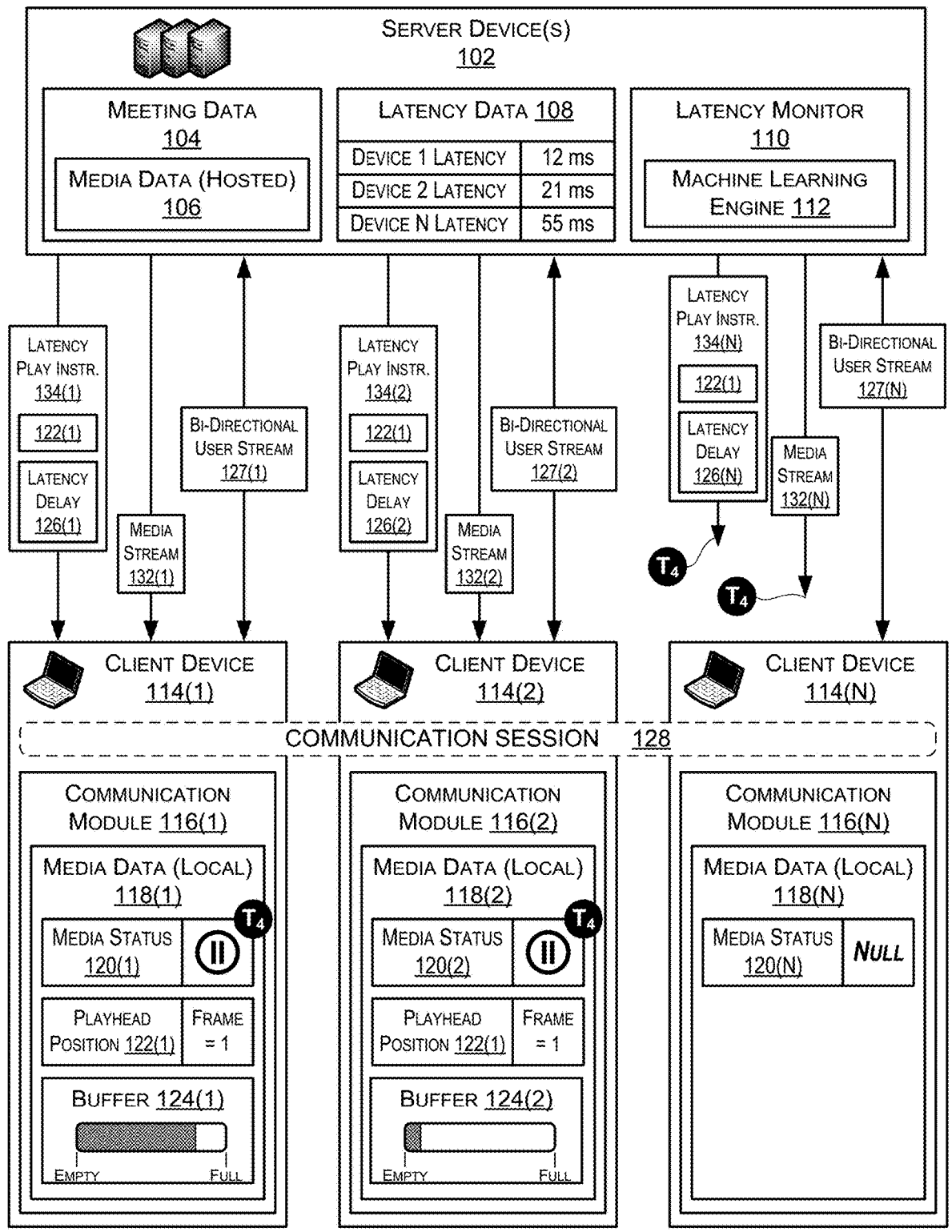
FIG. 1B illustrates the exemplary scenario of FIG. 1A subsequent to the system having dispatched a plurality of latency play instructions to the plurality of client devices to cause the video content to begin synchronously playing across the plurality of client devices notwithstanding disparities in networking latency at different ones of the client devices.

Turning now to FIG. 1B, illustrated is a fourth time $T_4$ at which the system 100 has dispatched a plurality of latency play instructions 134 to the various client devices 114. Specifically, the server devices 102 have dispatched a first latency play instruction 134(1) to the first client device 114(1), a second latency play instruction 134(2) to the second client device 114(2), and an Nth latency play instruction 134(N) to the Nth client device 114(N). Individual ones of the latency play instructions 134(1) may include an indication of the first playhead position 122(1) at which the video content is to begin playing.

In some embodiments, individual ones of the latency play instructions 134(1) define a latency delay 126 that is indicative of a time at which a receiving client device 114 is to begin playing the video content received in the media streams 132. As a specific but nonlimiting example, the latency delays 126 that are defined within the individual latency play instructions 134 may indicate amounts of time that the receiving client devices 114 are to wait (e.g., after receiving the latency play instruction 134) before playing the video content. In this way, individual client devices 114 which are experiencing less networking latency than other client devices 114 may be instructed to wait an appropriate amount of time before playing the video content in order to allow enough time for all of the client devices 114 to receive a corresponding media stream 132. Thus, rather than each individual client device 114 starting to play the video content immediately upon receiving the video content (which would likely result in asynchronous playback of the video content), the individual client devices 114 may be caused to wait until all of the other client devices have also received the video content.

To illustrate this point, presume that each of the first latency play instruction 134(1) through the Nth latency play instruction 134(N) are dispatched simultaneously from the server devices 102. Based on the latency data 108 in the illustrated scenario, further presume that the first latency play instruction 134(1) will be received 12 milliseconds after being dispatched, the second latency play instruction 134(2) will be received 21 milliseconds after being dispatched, and the Nth latency play instruction 134(N) will be received 55 milliseconds after being dispatched. It should be appreciated that based on these presumptions, the first latency play instruction 134(1) will be received by the first client device 114(1) 43 milliseconds prior to the Nth latency play instruction 134(N) being received by the Nth client device 114(N), and the second latency play instruction 134(2) will be received by the second client device 114(2) 34 milliseconds prior to the Nth latency play instruction 134(N) being received by the Nth client device 114(N). Under these exemplary but non-limiting circumstances, an appropriate first latency delay 126(1) may be 43 milliseconds, an appropriate second latency delay 126(2) may be 34 milliseconds, and an appropriate Nth latency delay 126(N) may be 0 milliseconds. Here, the first client device 114(1) may postpone playing the video content for 43 milliseconds after receiving the first latency play instruction 134(1), the second client device 114(2) may postpone playing the video content for 34 milliseconds after receiving the second latency play instruction 134(2), and the Nth client device 114(N) may begin playing the video content immediately upon receiving the Nth latency play instruction 134(N). Thus, it can be appreciated that in some examples each latency play instruction 134 that is transmitted to a respective client device 114 may define an amount of latency delay that is determined based on a difference between the latency begin experienced by the respective client device and the longest latency that is being experienced by any of the client devices 114. For example, here the Nth client device 114(N) is experiencing the longest latency (e.g., 55 ms) and the latency delay that is determined for each device is based on a difference between the current latency being experienced by that device 114 and the longest latency of 55 ms.

As illustrated, at the fourth time $T_4$, each of the first client device 114(1) and the second client device 114(2) have received both of the corresponding media stream 132 and latency play instruction 134. Thus, at the fourth time $T_4$, upon receiving the initial portion of the second media stream 132(2), the second client device 114(2) has established a second buffer 124(2) of the video content. Furthermore, at the fourth time $T_4$, the first buffer 124(1) of the video content is relatively fuller (e.g., contains relatively more bytes of data) than at the third time $T_3$ described in relation to FIG. 1A. However, at the fourth time $T_4$, the Nth client device 114(N) has yet to receive either of the Nth media stream 132(N) or Nth latency play instruction 134(N). Thus, as illustrated in FIG. 1B, at this fourth time $T_4$, the Nth client device 114(N) has yet to begin buffering the video content that is to be shared during the conference session 128. Thus, as illustrated in FIG. 1B, at time $T_4$ each of the first client device 114(1) and the second client device 114(2) are shown to have set the media status 120 of the video content to "pause" within the corresponding communication module 116 (e.g., to allow time for the Nth client device 114(N) to receive the Nth media stream 132(N)). In contrast, the media status at the Nth client device 114(N) remains "Null" at the fourth time $T_4$ since the Nth client device 114(N) has yet to receive the corresponding media stream 132 and/or latency play instruction 132.

Figure 1C:
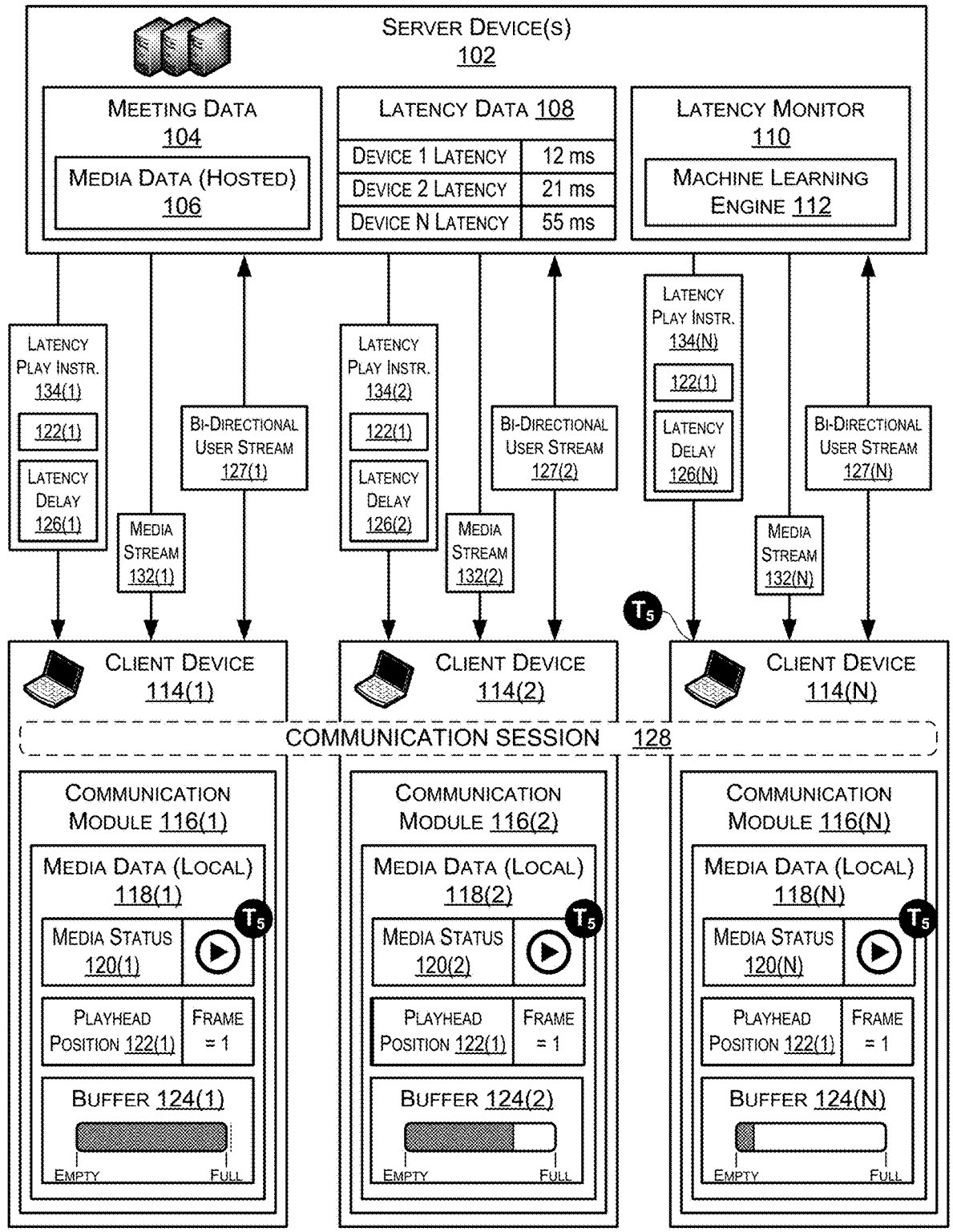
FIG. 1C illustrates the exemplary scenario of FIGS. 1A through 1B subsequent to each of the latency play instructions being received at a corresponding client device.

Turning now to FIG. 1C, illustrated is a fifth time $T_5$ at which the Nth client device 114(N) has now received both of the Nth media stream 132(N) and the Nth play instruction 134(N). Continuing with the example where the Nth latency delay 126(N) is 0 milliseconds, the Nth client device 114(N) begins playing the video content (from the Nth media stream) without delay upon receiving the Nth latency play instruction 134(N). For purposes of the present example, assume that the latency values indicated in the latency data 108 and used to determine the latency delays 126 are accurate. Thus, if the fifth time $T_5$ represents the moment at which the Nth latency play instruction 134(N) is received, then the fifth time $T_5$ also corresponds to the 43 millisecond delay from when the first client device 114(1) received the first latency play instruction 134(1) and the 34 millisecond delay from when the second client device 114(2) received the second latency play instruction 134(2).

By adhering to the latency delays 126 indicated within their respective latency play instructions 134, each of the first client device 114(1) through the Nth client device 114(N) are caused to begin playing the video content at the appropriate playback position 122 at precisely the same moment notwithstanding the different networking latencies experienced at the different client devices 114. To convey this point illustratively, each of the first media status 120(1) through the Nth media status 120(N) are shown to have been toggled to "play" at precisely the fifth time $T_5$. Thus, in contrast to conventional screen sharing techniques as described above, the playback position 122 at which the video content is being played is constant across all the client devices 114 (rather than being out-of-sync due to variations of networking latency). Furthermore, in contrast to these conventional screen sharing techniques, the techniques described herein do not require shared video content to be initially rendered and uploaded from a sharer's client device prior to being dispatched to other client devices. Thus, the amount of networking resources utilized during the conference session 128 while the video content is being shared is signifyingly reduced.

Figure 1D:
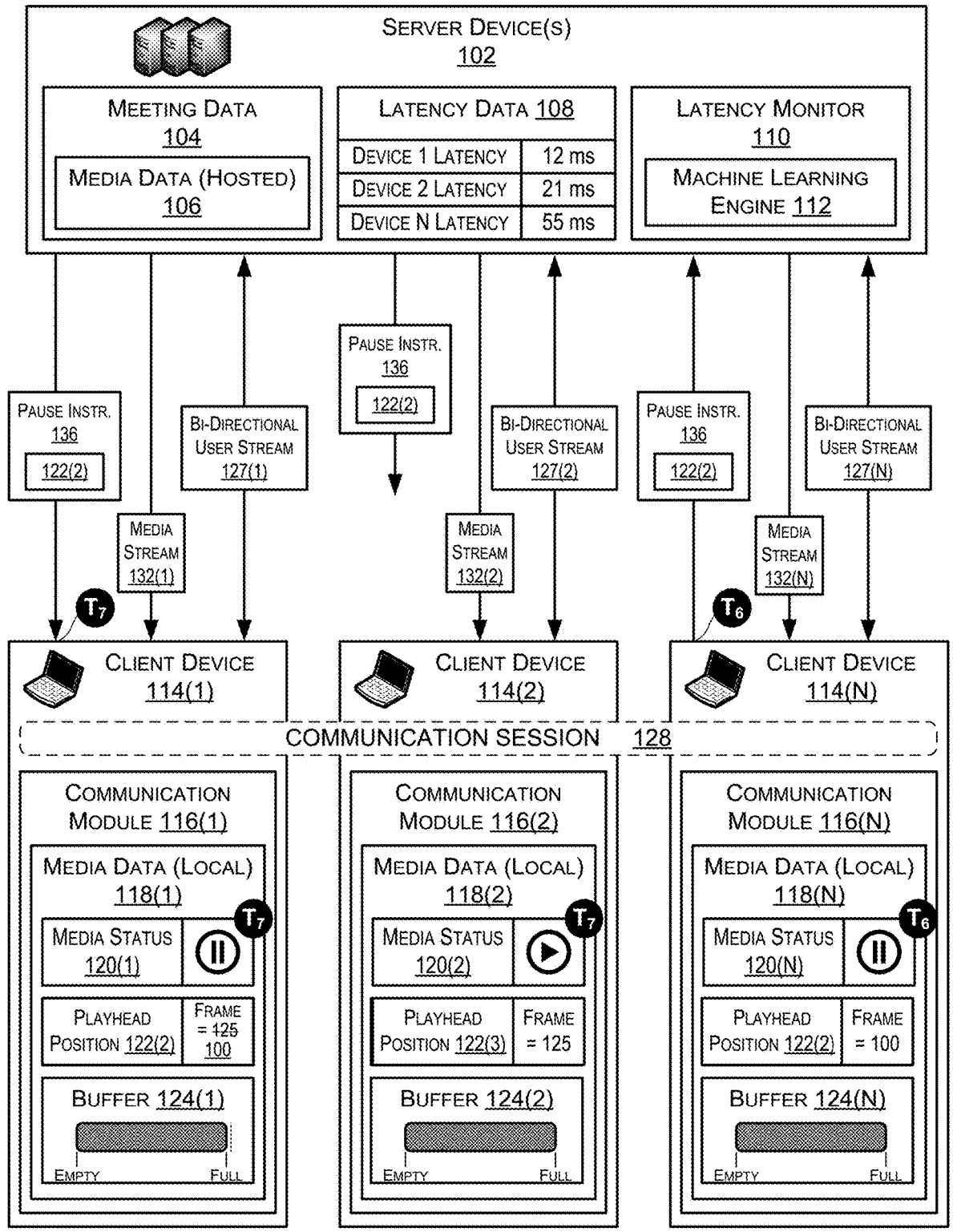
FIG. 1D illustrates the exemplary scenario of FIGS. 1A through 1C subsequent to the system having dispatched a plurality of pause instructions to cause playback of the video content to be paused at precisely the same playhead position across all of the client devices notwithstanding the disparities in networking latency at different ones of the client devices.

Turning now to FIG. 1D, illustrated is an exemplary scenario of a pause instruction 136 being generated at an individual client device 114 to cause playback of the video content that is being shared during the communication session 128 to be paused at precisely the same playhead position 122 across all of the client devices 114 being used to participate in the communication session 128. In the illustrated scenario, the pause instruction 136 is initially generated at a sixth time $T_6$ based on user input that is received at the Nth client device 114(N) when the video content is at a second playhead position 122(2). For purposes of the present discussion, presume that that second playhead position 122(2) (e.g., at which a participant whom is using the Nth client device 114(N) pauses the video content) corresponds to "Frame 100" of the video content. Thus, at the sixth time $T_6$ the Nth media status 120(N) toggles from "play" to "pause" precisely at the second playhead position 122(2). Furthermore, at the sixth time $T_6$, the Nth client device 114(N) transmits the pause instruction 136 to the server devices 102. It will be appreciated that since $T_6$ corresponds to the moment at which the pause instruction 136 is sent from the Nth client device 114(N) but is prior to the pause instruction 136 being relayed to either of the first client device 114(1) or the Nth client device 114(N), at the sixth time To the video content will still be being played at the first and second client devices. In some embodiments, the pause instruction 136 includes data that defines the specific playhead position (e.g., in terms of playhead time and/or frame) at which the video content is to be commonly paused across the client devices 114. For example, as illustrated, the pause instruction 136 defines the second playhead position 122(2) at which the video content was playing at the sixth time $T_6$.

Based on the discussion above regarding networking latencies, it will be appreciated that some amount of time will transpire between when the pause instruction 136 is sent by the Nth client device 114(N) and when the pause instruction 136 is received by the other client devices 114. Furthermore, since the networking latencies experienced by the first device 114(1) is different than the networking latency experienced by the second device 114(2), it will be further appreciated that even if instances of the pause instruction 136 are transmitted to each of these devices (e.g., from the server devices 102) at precisely the same moment in time, instances of the pause instruction 136 may still be received at the first and second client devices at different times. For example, as illustrated, at a seventh time $T_7$ an instance of the pause instruction 136 has been received at the first client device 114(1) while another instance of the pause instruction 136 has yet to be received at the second client device 114(2). Thus, at the seventh time $T_7$, the media status 120 of the video content has been toggled to "pause" at the first client device 114(1). Furthermore, at the seventh time $T_7$, the playhead position at the first client device 114(1) has been updated from a third playhead position 122(3) (e.g., frame 125 of the video content) to the second playhead position 122(2) at which the video content was paused at the Nth client device 114(N).

As illustrated, however, at the seventh time $T_7$ the media status 120 of the video content at the second client device 114(2) remains as play due to the second client device 114(2) having yet to receive an instance of the pause instruction 136. Thus, it will be appreciated that the video content may continue to play even past the third playhead position 122(3) at the second client device 114(2) at least until a pause instruction 136 is received. Then, upon receipt of an instance of the pause instruction 136, the video content will be paused at the second client device 114(2) and the playhead position will be updated to the second playhead position 122(2). Thus, notwithstanding networking latencies, once all of the client devices 114 receive an instruction to pause the video content and an indication of the specific playhead position to pause the video content, then the video content will become synchronously paused at exactly the same playhead position across all of the client devices 114.

The presently disclosed technologies are applicable to a variety of systems and approaches for sharing media content during a communication session while compensating for disparities in networking latency across a plurality of client devices to cause shared media content to be played synchronously across the plurality of client devices. Aspects of the disclosed technologies are predominantly described in the context of sharing video content that is hosted on server devices 102 that are configured to facilitate the communication session 128 during which the video content is shared. While the presently disclosed technologies are not necessarily limited to this context, an appreciation of various aspects of the presently disclosed technologies is best gained through a discussion of examples in this specific context. However, the presently disclosed technologies may also be deployed in scenarios in which the shared video content is not hosted on the same server devices 102 that facilitate the communication session 128 (e.g., by generating and/or transmitting bi-directional user streams as described above). For example, the presently disclosed technologies are also applicable to scenarios in which the video content (or any other type of media content that is to be shared during the communication session) is hosted by a third-party media hosting service provider such as, for example, YOUTUBE, VIMEO, and TWITCH. In such implementations it should be appreciated that the bi-directional user streams 126 may be transmitted between the plurality of client devices 114 by the server devices 102 as described above concurrently with the media streams 132 being received by the individual client devices 114 from other servers associated with the third-party media hosting service provider.

In some embodiments, the system 100 may enable a playback mode associated with playback of the media content to be toggled between a synchronous playback mode and an asynchronous playback mode across the client devices 114. For example, due to the media content being received at the individual client devices 114 from the media streams 132 independently from the bi-directional user streams 132, it can be appreciated that the precise playback position of the media content may be independently controlled at each of the individual client devices 114 without affecting an ability to hear and/or see video and/or audio of other participants that is being received in the bi-directional user streams. For example, a first user that is participating in the communication session at the first client device 114(1) may decide to fast forward playback of the media content whereas a second user that is participating in the communication session at the second client device 114(2) may decide to watch the media content at a normal playback speed. In such a scenario, it can be appreciated that the first playhead position 122(1) of the media content at the first client device 114(1) may become continually farther ahead of a second playhead position 122(2) of the media content at the second client device 114(2) (i.e., so long as the playback speed at the first client device 114(1) is greater than that at the second client device 114(2)). As used herein, the term "asynchronous playback mode" may be used to refer to a playback mode which may be enabled at the individual client devices to enable the individual playback positions of the media content to be controlled at each individual client device independently from where the playhead position of the media content is at other individual client devices. As used herein, the term "synchronous playback mode" may be used to refer to a playback mode which may be enabled at the individual client devices to synchronize the playback positions of the media content across the plurality of client devices.

As an exemplary but non-limiting scenario of toggling between playback modes, during the communication session 128 and while media content is being shared, the system 100 may receive a first playback mode command in association with the playback of the media content, where the first playback mode command instructs the system 100 to toggle the playback mode to the asynchronous playback mode across all of the client devices. Then, in response to this first playback mode command, the system 100 may transmit a plurality of playback mode commands to the plurality of client devices 114, thereby enabling individual playhead positions of the playback of the media content to be independently adjusted at each one of the individual client devices. For example, as described above, while the first device 114(1) is in the asynchronous playback mode a user at the first client device 114(1) may adjust the playhead position at that first client device without affecting the playhead position at the second client device 114(2).

Then, at some point in time when the individual client devices 114 are operating in asynchronous playback mode, the system 100 may receive a second playback mode command in association with the playback of the media content, where the second playback mode command instructs the system 100 to toggle the playback mode to the synchronous playback mode across all of the client devices. Then, in response to this second playback mode command, the system 100 may transmit a plurality of playback mode commands to the plurality of client devices 114, thereby causing each of these individual client devices 114 to update the playhead position to some specific playhead position that is specified within the received playback mode commands. For example, the first device 114(1) may be used to generate a synchronous playback mode command while to synchronize the playhead positions at all of the client devices to the current playhead position of the media content at the first client device 114(1).

Aspects of the disclosed technologies are predominantly described in the context of a play instruction being generated based on user input that is received at an individual one of multiple different client devices that are being used to participate in a communication session. For example, a user may click on a "play button" on their client device to initiate playback of the media content across the multiple different client devices. A play instruction that is generated based on such user input may be referred to herein as a user play instruction. However, such context is used for illustrative purposes only and many other scenarios are contemplated and within the scope of the present disclosure. In another exemplary context playback of the media content across the multiple client devices may be initiated or otherwise controlled from one or more server devices performing the techniques described herein. For example, a web-based broadcasting service such as an internet-based television broadcasting service (e.g., DirectTV Now) may in some instances activate a live streaming event with built-in latency control and/or compensation as described herein. Thus, references in this specification and/or the appended claims to a "play instruction" may be used as a generic term that encompasses both "user play instruction(s)" and other types of play instructions that are generated to initiate other otherwise control playback of the media content. Similarly, references to a "pause instruction" may be used as a generic term that encompasses both "user pause instruction(s)" and other types of pause instructions.

Figure 2:
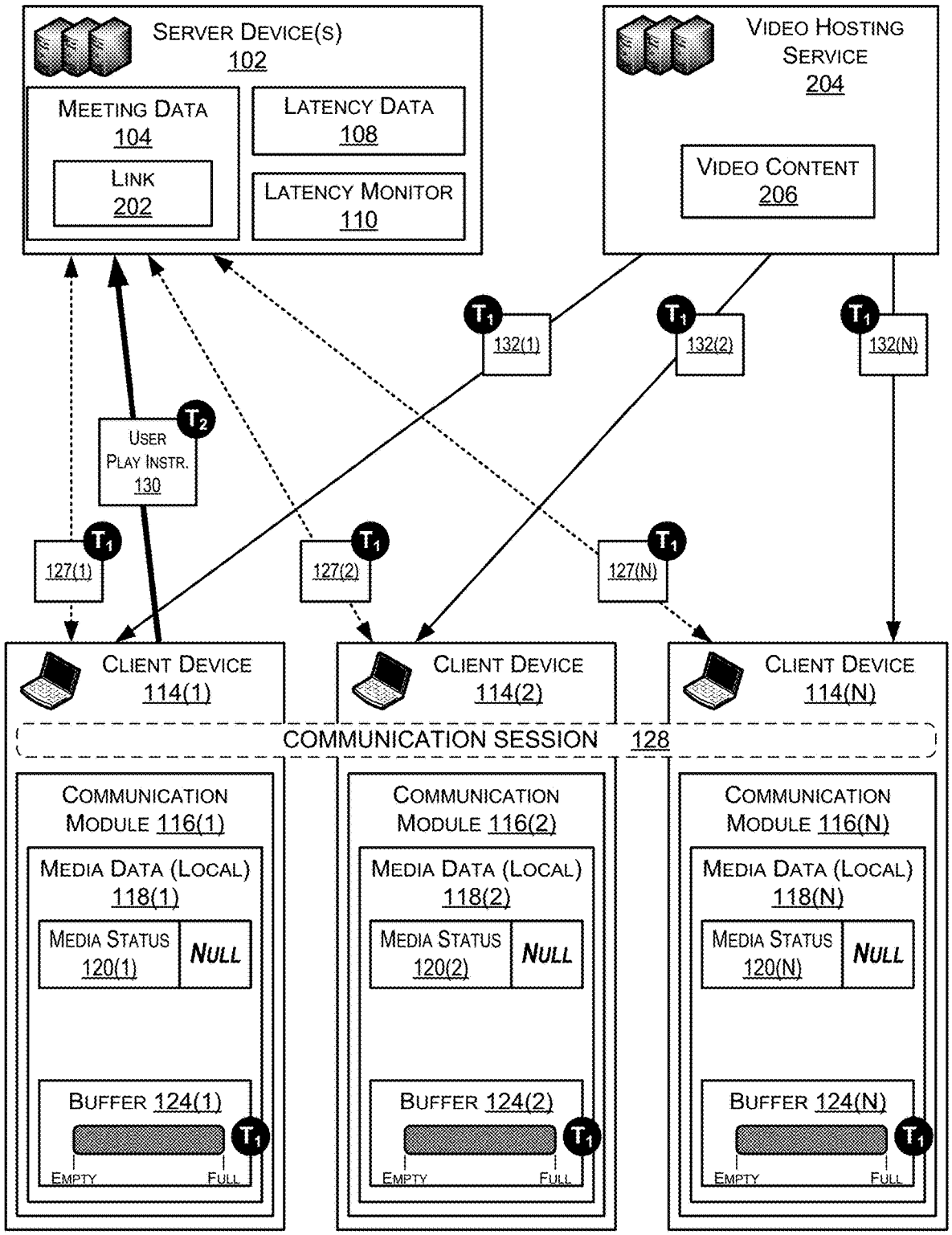
FIG. 2 illustrates an alternate scenario for a system to facilitate synchronous sharing of video content during a communication session.

FIG. 2 illustrates an alternate scenario for a system 200 to facilitate synchronous sharing of video content 206 during a communication session 128. As illustrated, the system 200 includes one or more server devices 102 that facilitate the communication session 128 by transmitting a plurality of bi-directional user streams 126 between a plurality of client devices 114. The bi-directional user streams 126 shown in FIG. 2 may be similar to those described in relation to FIGS. 1A though 1D. For example, the first bi-directional user stream 126(1) shown in FIG. 2 may correspond to a combination of an upload stream of audio/video data captured by input devices that are physically installed within the first client device 114(1) and also a download stream that includes audio/video data captured by input device(s) that are physically installed within both of the second and Nth client devices client device.

In the illustrated scenario, the meeting data 104 that defines aspects of the communication session 128 includes a link 202 that points to (e.g., provides an address for) video content 206 that is hosted by a video hosting service 204. In some embodiments, the video hosting service 204 may be a third-party service that facilitates publicly hosting of video content (e.g., hosting videos that can be access over the internet by anyone—without restriction). Additionally, or alternatively, the video hosting service 204 may be a service that facilitates privately hosting video content (e.g., such that only invitees to the communication session 128 can access the video content). Individual ones of the client devices 114 may utilize the link 202 to access the video content 206 from the video hosting service 204. For example, as illustrated in FIG. 2, each of the first client device 114(1) through the Nth client device 114(N) utilize the link 202 to establish communications with the video hosting service 204 and, ultimately, to obtain a corresponding media stream 132 through which the video content 206 is obtained.

In some embodiments, such as that shown in FIG. 2, the communication modules 116 may being buffering the video content 206 (which will eventually be shared during the communication session 128) prior to a user play instruction 130 being generated in association with the video content 206. To illustrate this point, the scenario of FIG. 2 is described with respect to a first time $T_1$ and a second time $T_2$, where $T_1<T_2$. As shown, at the first time $T_1$ each of the client devices 114 are communicating respective bi-directional user streams 126 with the server devices 102 so as to facilitate the communication session 128. As further shown, at the first time $T_1$ each of the client devices 114 are receiving respective media streams 132 from the video hosting service 204 to independently maintain buffers 124 of the video content 206.

Later, at the second time $T_2$, a user play instruction 130 is generated at the first client device 114(1) and transmitted to the server devices 102. Upon receiving the user play instruction 130, the server devices 102 may dispatch latency play instructions 134 to individual ones of the client devices 114 as described in relation to FIGS. 1B and 1C. For example, the one or more server devices 102 may determine custom latency delay values 126 for each individual client device 114. Then, the one or more server devices 102 may dispatch a latency play instruction 134 to each client device 114 that includes the determined custom latency delay value 126 for that client device 114. As described above, upon receiving the latency play instructions 134, each of the client devices 114 may begin playing the video content 206 after waiting for delay time indicated by that client device's custom latency delay value 126.

Thus, in some embodiments, the latency play instructions 134 may be simultaneously dispatched to the plurality of client devices 114 and may be configured to instruct the client devices 114 to postpone playing the video content 206 for some amount of time that is determined based on the networking latency experienced at the individual client devices 114. Such an embodiment is described in the exemplary scenario of FIGS. 1A through 1D. Alternatively, the server devices 102 may stagger the timing at which the latency play instructions 134 are transmitted to each particular client device 114 based on the networking latency experienced by the particular client devices 114. For example, if a first client device is experiencing a networking latency that is 10 milliseconds less than a second client device, then a first latency play instruction may be dispatched to the first client device 10 millisecond after a second latency play instruction is dispatched to the second client device. Then, each of the first and second client devices will receive their respective latency play instruction at substantially the same moment in time. In such embodiments, the individual client devices may begin playing the video content without delay upon receipt of their corresponding latency play instruction.

Figure 3A:
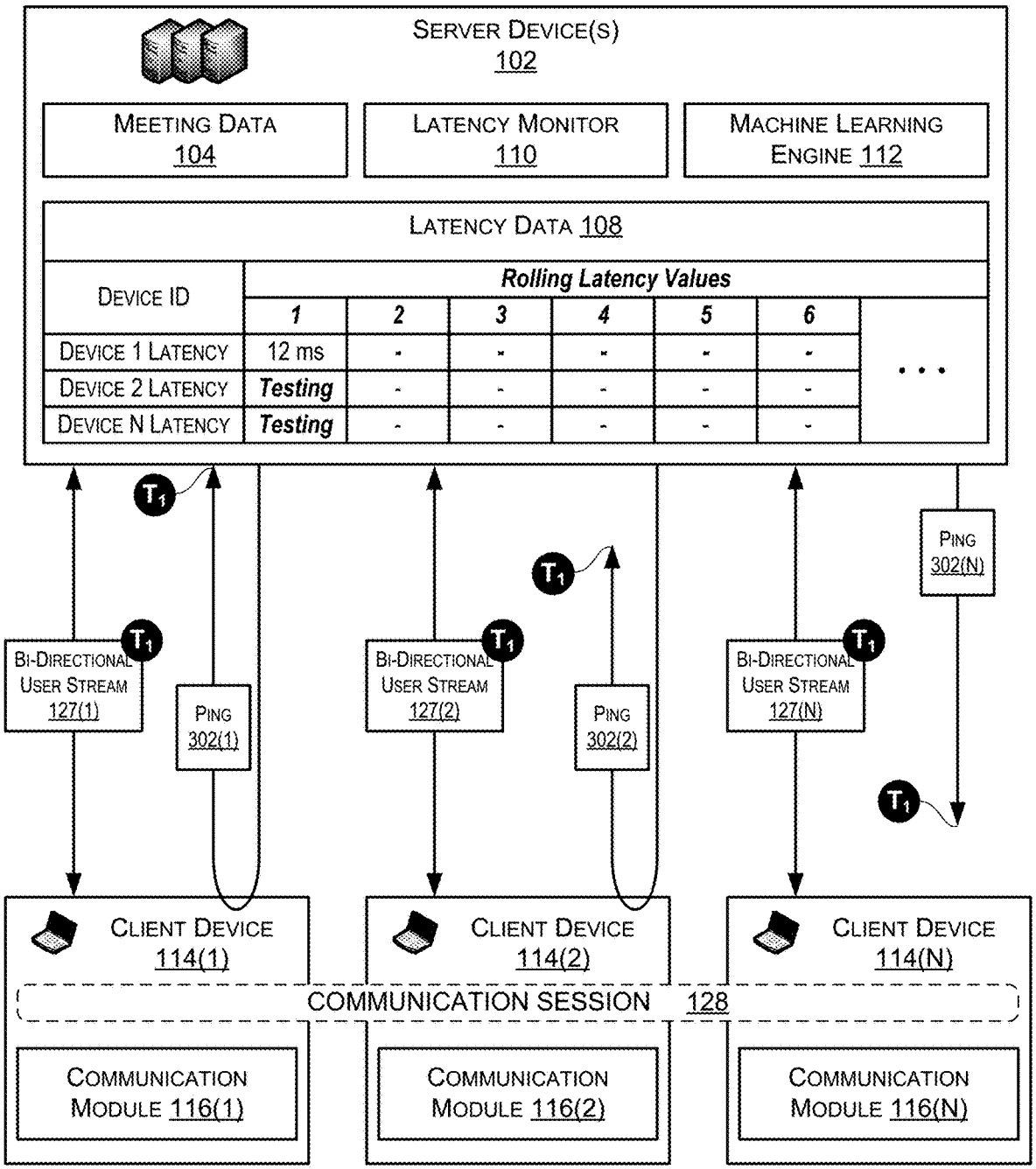
FIG. 3A illustrates an exemplary scenario for a system to determine latency values in association with individual client devices that are being used to participate in a communication session.

FIG. 3A illustrates an exemplary scenario for a system 300 to determine latency values in association with individual client devices 114 that are being used to participate in a communication session 128. In the illustrated implementation, latency values are determined on a rolling basis to accommodate for changes in networking latencies for the individual client devices 114 throughout the communication session 128. For example, latency values for each individual client device 114 may be updated in accordance with some predefined interval of time (e.g., two seconds). Based on this predefined interval of time, the system 300 may periodically "ping" individual client devices 114 to determine the current networking latency that is being experienced at the individual client devices 114. Aspects of the exemplary scenario in which the system 300 determines latency values during the communication session 128 are described in FIGS. 3A through 3D with respect to a first time $T_1$ through a fourth time $T_4$, where $T_1<T_2<T_3<T_4$.

At the first time $T_1$, one or more server devices 102 are facilitating the communication session 128 by transmitting a plurality of bi-directional user streams 126 between a plurality of client devices 114. In this way, the system 300 is enabling participants of the communication session 128 to converse via live audio/video streams of one another (e.g., the communication session 128 may be a web-based video conference). As described above, the system 300 may utilize latency data 108 to cause media content that is shared during the communication session 128 to be played synchronously across all of the client devices 114. It should be appreciated that having accurate and up-to-date latency values for each individual client device 114 may be useful for these purposes.

With respect to obtaining accurate and up-to-date latency values on a per-device basis, the system 300 may deploy a latency monitor 110 during the communication session 128 to generate the latency data 108 in association with individual ones of the client devices 114. For example, during the communication session 128, the latency monitor 110 may periodically transmit pings 302 to individual client devices 114. As used herein, the term "ping" may refer to an instance of information that is transmitted to a computing device from a source (e.g., the server devices 102) and which is at least partially echoed back to the source from the computing device. The latency monitor 110 may calculate the networking latency associated with individual client devices 114 based on the round-trip time that it takes for the individual pings to reach the client devices 114 and then be returned to the one or more server devices 102. For example, assuming that each leg of these individual round-trips are equal in time, the latency value associated with any individual client device 114 may be assumed to be the measured round-trip time divided in half.

For purposes of the present discussion, presume that slightly prior to the first time $T_1$ a first ping 302(1) through an Nth ping 302(N) are dispatched to the first client device 114(1) through the Nth client device 114(N), respectively. Then, as illustrated in FIG. 3A, the first ping 302(1) is echoed by the first client device 114(1) back to and received by the server devices 102 at the first time $T_1$. Based on the round-trip time of this first ping 302(1), the latency monitor 110 determines the current networking latency that is affecting the first client device 114(1). For purposes of the present discussion, presume that the round-trip time for the first ping 302(1) is 24 milliseconds. Further presume that the latency monitor 110 is programed to presume that the amount of time the pings 302 take to travel over one or more networks from the server devices 102 to the individual client devices 114 is equal to the amount of time the pings 302 take to be returned over the one or more networks from the individual client devices 114 to the server devices 102. Stated alternately, the latency monitor 110 may presume that each leg of a round-trip are equal in time. Thus, as illustrated in FIG. 3A, the latency monitor 110 updates the latency data 108 to define a latency value of 12 milliseconds for the first client device 114(1).

At the first time $T_1$, neither of the second ping 302(2) nor the Nth ping 302(N) have completed their respective round-trips back to the server devices 102. For this reason, as illustrated in FIG. 3A, at the first time $T_1$ latency testing is still in progress with respect to the second client device 114(2) and the Nth client device 114(N).

Figure 3B:
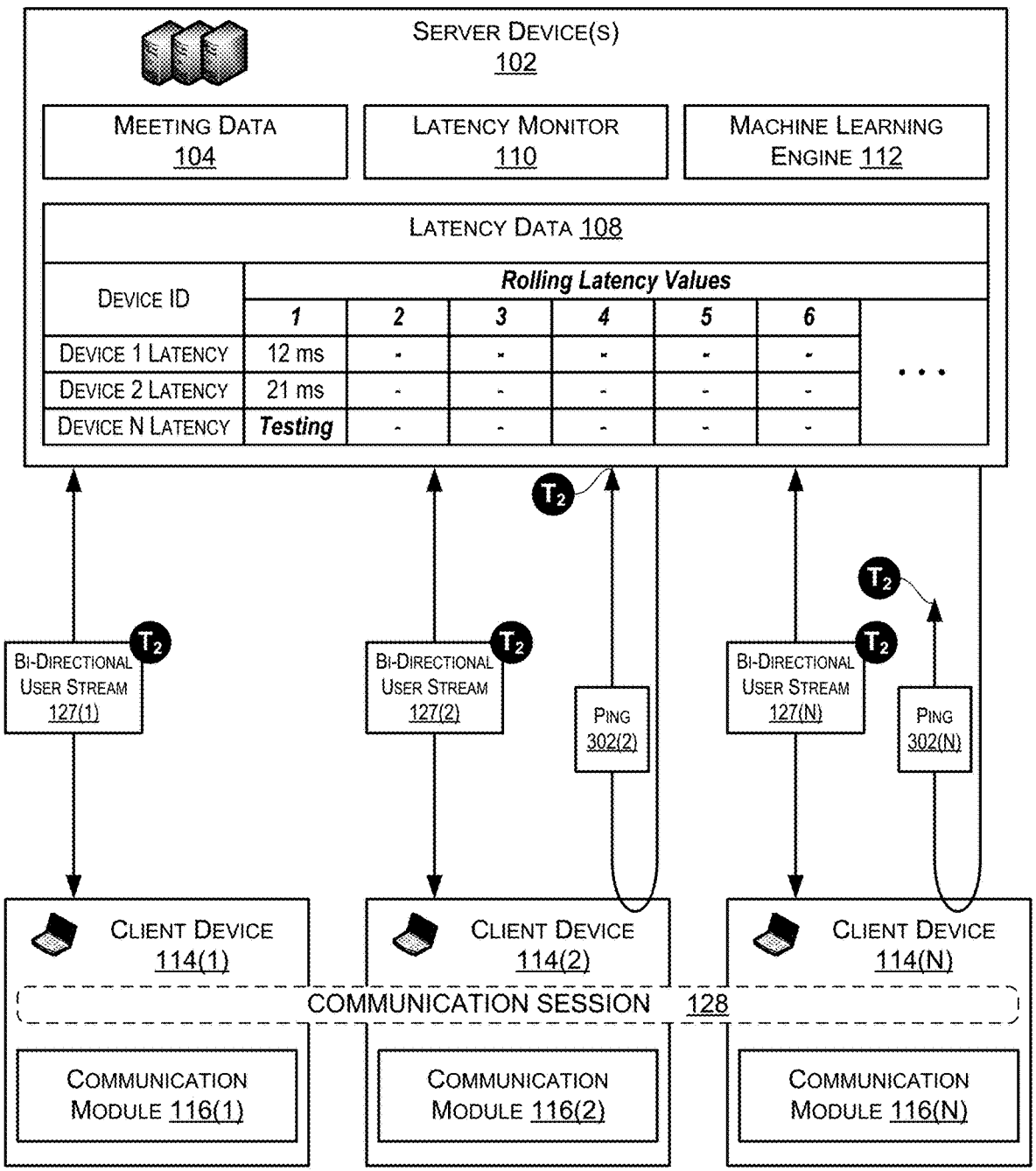
FIG. 3B shows the exemplary scenario for the system to determine latency values in association with individual client devices at a later time as compared to FIG. 3A.

Turning now to FIG. 3B, the exemplary scenario for the system 300 to determine latency values in association with the individual client devices 114 is shown at a second time $T_2$ that corresponds to the second ping 302(2) completing a round-trip back to the server devices 102. Based on the round-trip time of this second ping 302(2), the latency monitor 110 determines the current networking latency that is affecting the second client device 114(2). For purposes of the present discussion, presume that the round-trip time for the second ping 302(2) is 42 milliseconds. Thus, as illustrated in FIG. 3B, responsive to the second ping 302(2) being returned at the second time $T_2$, the latency monitor 110 updates the latency data 108 to define a latency value of 21 milliseconds for the second client device 114(2).

At the second time $T_2$, the Nth ping 302(N) has yet to complete its round-trips back to the server devices 102. For this reason, as illustrated in FIG. 3B, at the second time $T_2$ latency testing is still in progress with respect to the Nth client device 114(N).

Figure 3C:
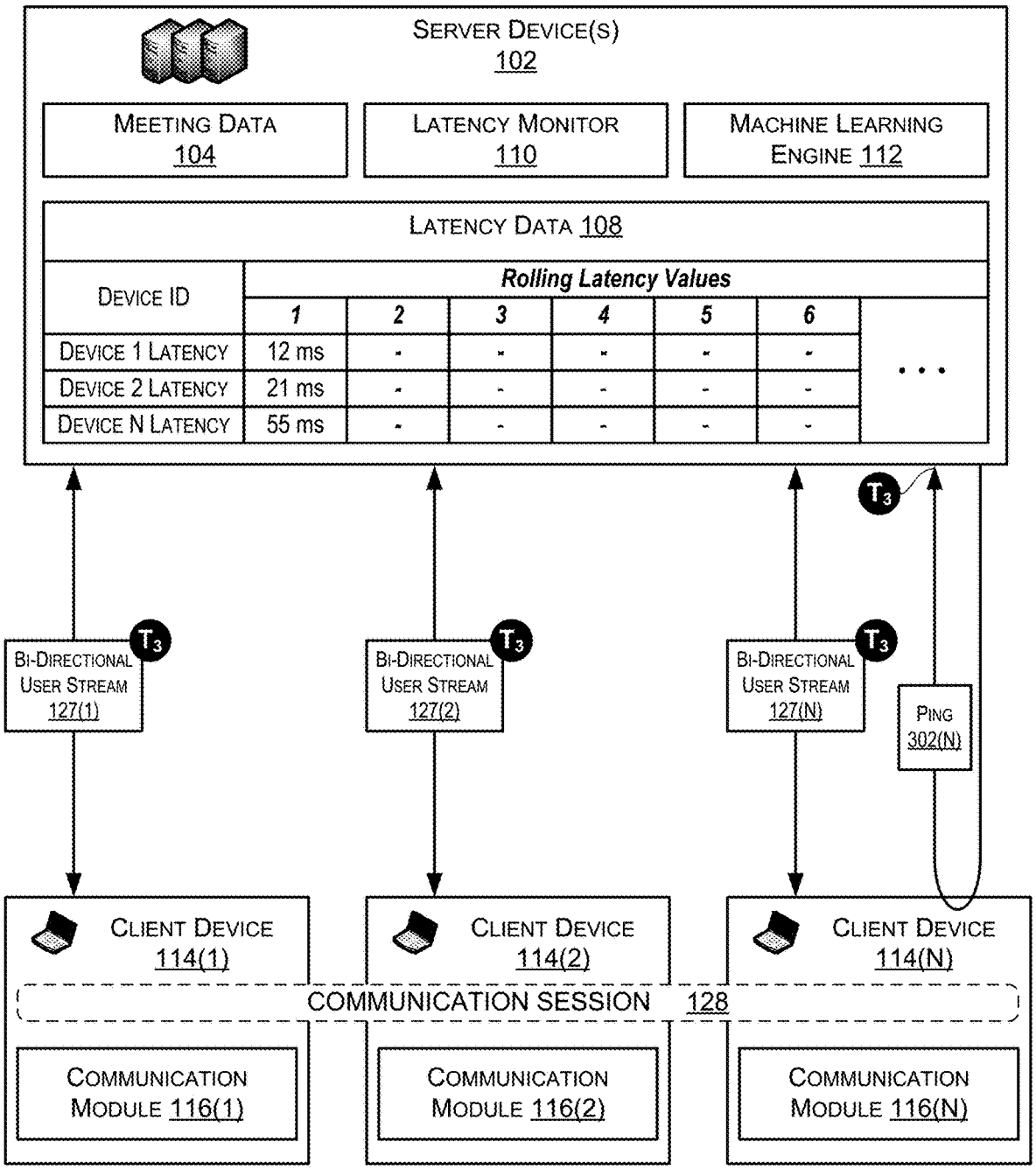
FIG. 3C shows the exemplary scenario for the system to determine latency values in association with individual client devices at a later time as compared to FIG. 3B.

Turning now to FIG. 3C, the exemplary scenario for the system 300 to determine latency values in association with the individual client devices 114 is shown at a third time $T_3$ that corresponds to the Nth ping 302(N) completing a round-trip back to the server devices 102. Based on the round-trip time of this Nth ping 302(N), the latency monitor 110 determines the current networking latency that is affecting the Nth client device 114(N). For purposes of the present discussion, presume that the round-trip time for the Nth ping 302(N) is 110 milliseconds. Thus, as illustrated in FIG. 3C, responsive to the Nth ping 302(N) being returned at the third time $T_3$, the latency monitor 110 updates the latency data 108 to define a latency value of 55 milliseconds for the Nth client device 114(N).

Figure 3D:
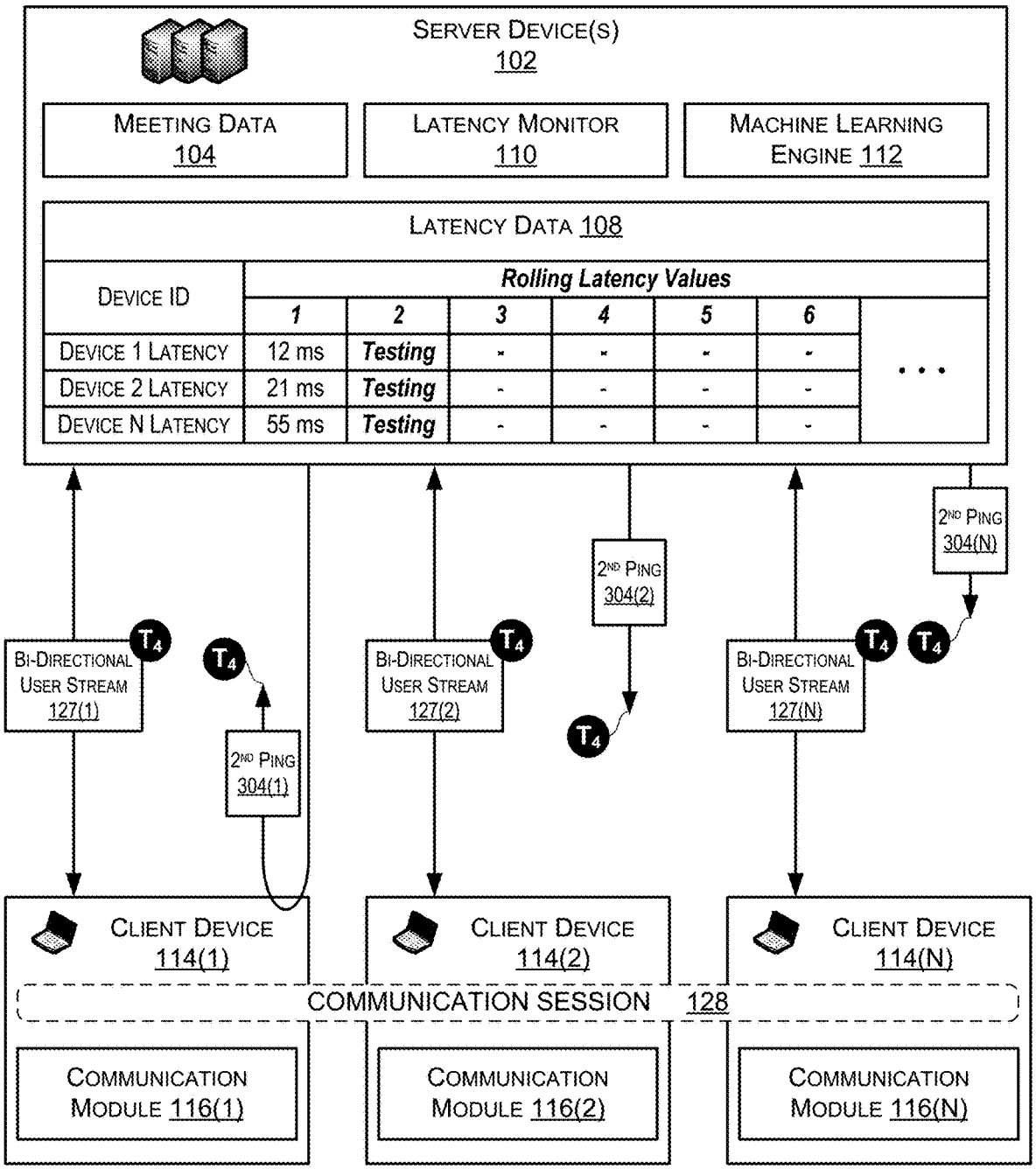
FIG. 3D shows the exemplary scenario for the system to determine latency values in association with individual client devices at a later time as compared to FIG. 3C.

In some implementations, the system 300 may be configured to generate latency data 108 on a rolling basis such that latency values for the individual client devices 114 are continually updated during a communication session 128. For example, the system 300 may be configured to periodically ping the individual client devices 114 and to update the latency values associated with the individual client devices 114 as these periodically transmitted pings 302 are echoed back to the server devices 102. For example, as shown in FIG. 3D, at a fourth time $T_4$ after an initial group of pings 302 have been sent and echoed back to the server devices 102, a second group of pings 304 are dispatched to the first through the Nth client devices 114. As illustrated, at the fourth time $T_4$ none of the individual 304 have completed their respective round trip back to the server devices 102 and, therefore, testing remains in progress with respect to this second group of pings 304. Later, the latency data 108 may be continually updated as individual ones of these pings 304 complete their respective round trips.

Figure 4A:
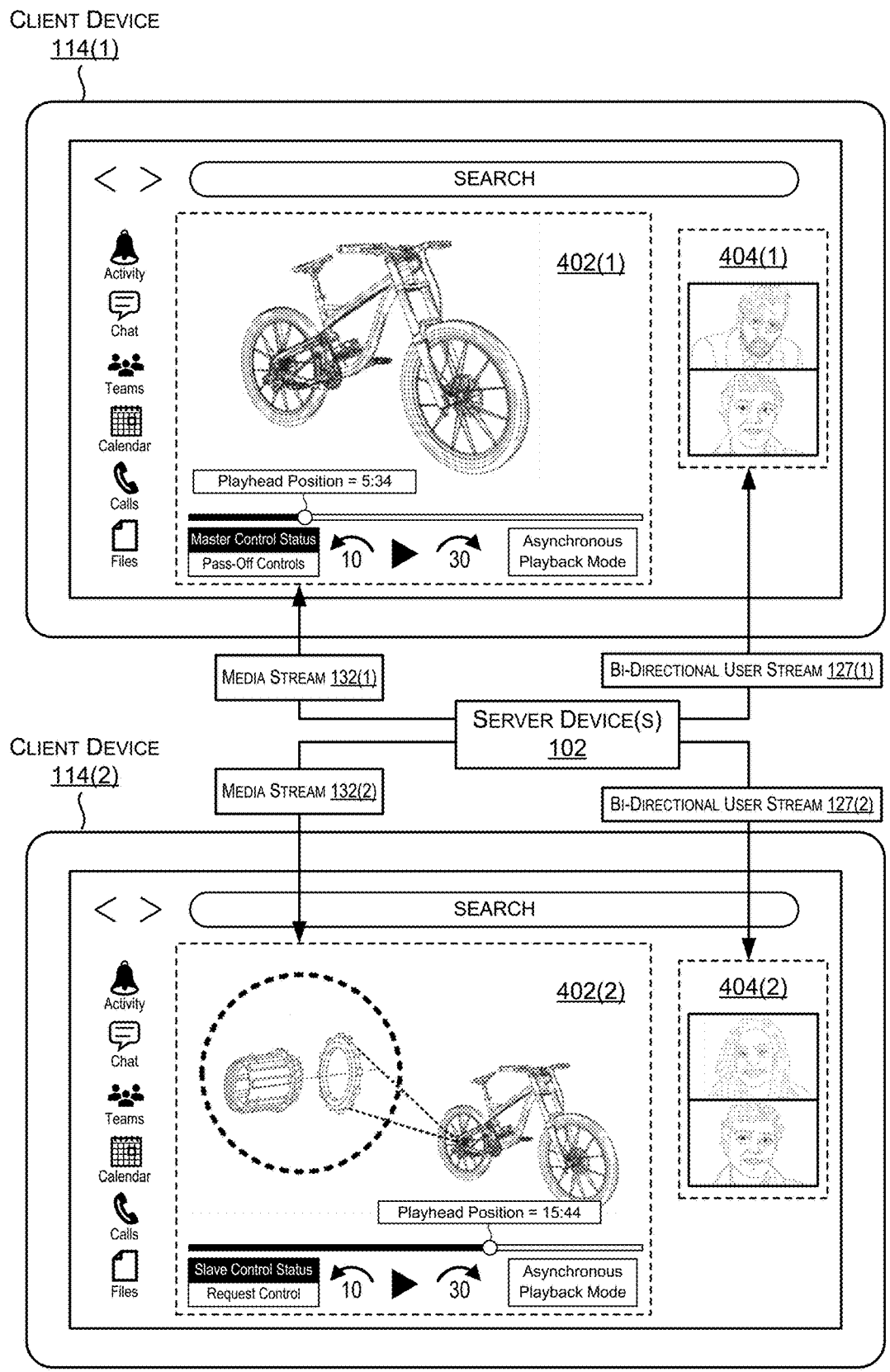
FIG. 4A shows exemplary graphical user interfaces that may be concurrently displayed on two different client devices that are operating within an asynchronous playback mode in accordance with the techniques described herein.

Turning now to FIG. 4A, illustrated are two exemplary graphical user interfaces that may be concurrently displayed on a first client device 114(1) and a second client device 114(2) while those devices are operating within an asynchronous playback mode. As illustrated, the first client device 114(1) is receiving a first media stream 132(1) from the server devices 102 and the second client device 114(2) is receiving a second media stream 132(2) from the server devices 102. Here, the first client device 114(1) and the second client device 114(2) are utilizing the first media stream 132(1) and the second media stream 132(2), respectively, to render media content 402 such as an MP4 video. As further illustrated, the first client device 114(1) is receiving a first bi-directional user stream 126(1) from the server devices 102 and the second client device 114(2) is receiving a second bi-directional user stream 126(2) from the server devices 102. Here, the first client device 114(1) and the second client device 114(2) are utilizing the first bi-directional user stream 126(1) and the second bi-directional user stream 126(2), respectively, to render live video 404 of one or more other participants of the communication session 128 (e.g., audio and/or video content that is being captured via input devices at the client devices 114).

As illustrated in FIG. 4A, the media content being received independently from the bi-directional user streams 132 enables the first client device 132(1) and the second client device 114(1) to adjust the playback position of the media content independently from one another while still rendering the live video and/or audio that is being received during the communication session 128. For example, a first user that is participating in the communication session at the first client device 114(1) has adjusted the playback position to 5 minutes and 34 seconds whereas a second user that is participating in the communication session at the second client device 114(2) has adjusted the playback position to 15 minutes and 44 seconds. As used herein, the term "asynchronous playback mode" may be used to refer to a playback mode which may be enabled at the individual client devices to enable the individual playback positions of the media content to be controlled at each individual client device independently from where the playhead position of the media content is at other individual client devices.

Figure 4B:
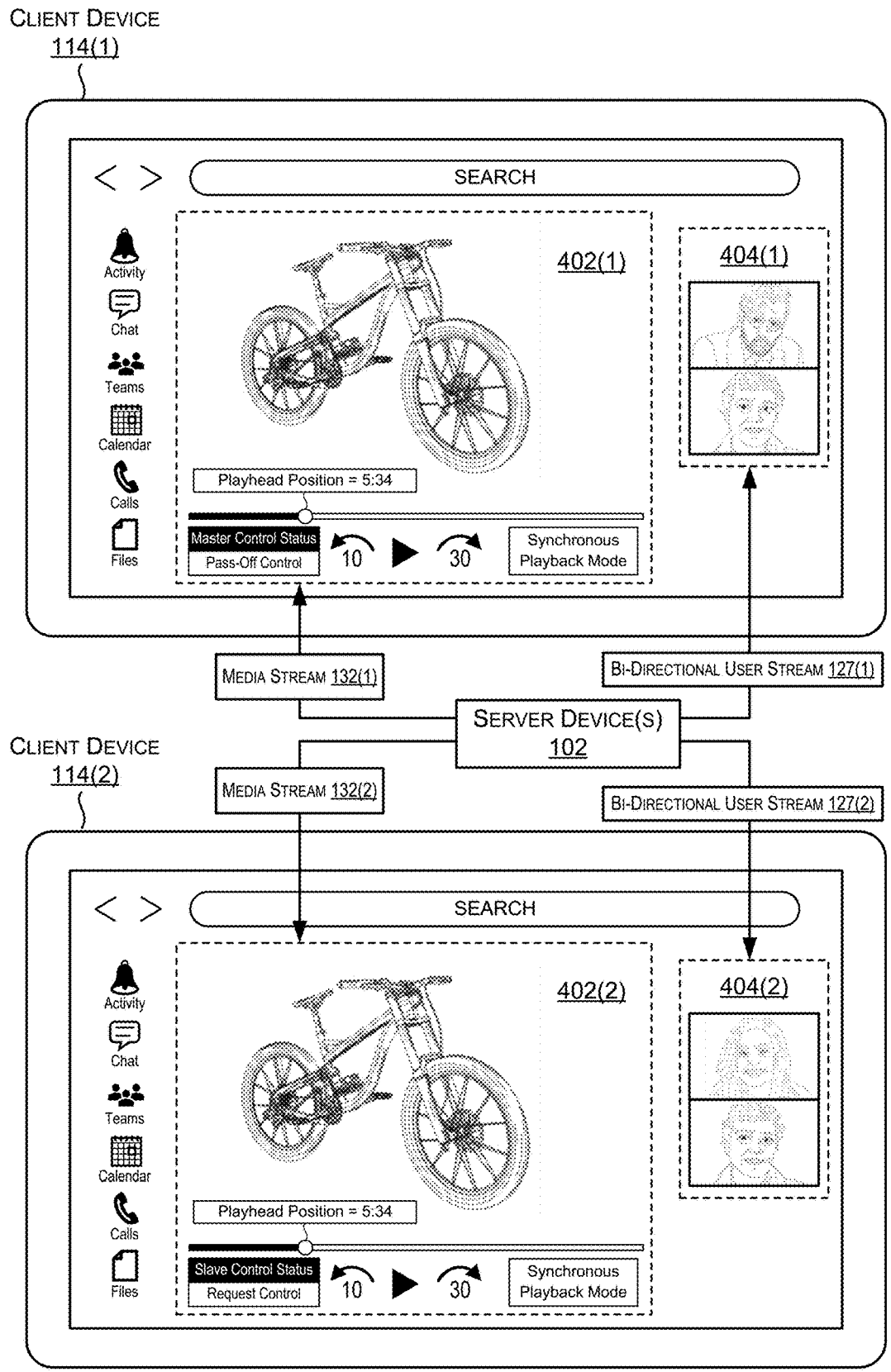
FIG. 4B shows exemplary graphical user interfaces that may be concurrently displayed on two different client devices that are operating within a synchronous playback mode in accordance with the techniques described herein.

Turning now to FIG. 4B, illustrated are two exemplary graphical user interfaces that may be concurrently displayed on the first client device 114(1) and the second client device 114(2) after those devices have been toggled from the asynchronous playback mode to a synchronous playback mode. For example, during the communication session 128 and while the client devices 114 are operating in the asynchronous playback mode as described in relation to FIG. 4A, a user that is operating the first client device 114(1) may provide user input to that first client device 114(1) to cause all (or a subset of) the other client devices 114(1) to toggle from the asynchronous playback mode into the synchronous playback mode. As a result of this user input, the system 100 may transmit individual playback mode commands to individual client devices, thereby causing each of these individual client devices 114 to update the playhead position to some specific playhead position that is specified within the received playback mode commands. For example, the first device 114(1) may be used to generate a synchronous playback mode command while to synchronize the playhead positions at all of the client devices to the current playhead position of the media content at the first client device 114(1). In the specifically illustrated but non-limiting example, responsive to the user input that is received at the first client device 114(1), the playback position at the second client device 114(2) is snapped to (e.g., synchronized with) the current playback position at the first client device 114(1) (i.e., 5 minutes and 34 seconds). As used herein, the term "synchronous playback mode" may be used to refer to a playback mode which may be enabled at the individual client devices to synchronize the playback positions of the media content across the plurality of client devices.

In some implementations, user rights or permissions to control aspects of the playback of the media content across all of the client devices 114 may be restricted to a particular client device 114 having a master control status. For example, as illustrated in FIG. 4B, the first client device 114(1) is displaying an indication that this device currently has "Master Control Status" with respect to the playback of the media content whereas the second client device 114(2) is displaying an indication that this device currently has "Slave Control Status." In some embodiments, particular client device that has master control status with respect to the media content is permitted to toggle the playback mode across the plurality of client devices between the synchronous playback mode shown in FIG. 4B and the asynchronous playback mode shown in FIG. 4A. Thus, a participant of the communication session that currently has user permissions that bestow master control status may be able to permit or restrict other participants of the communication session from independently controlling the playback position of the media content at their respective client devices. For example, a participant having master control status may toggle the playback mode to the asynchronous playback mode so that all participants can independently control their own media playback. Then, as he or she sees fit, the participant having master control status can toggle the playback mode back to the synchronous playback mode to cause the playback position across all of the client devices to be synced up with the particular playhead position that is currently being displayed at the particular "master user" participant's client device.

Figure 4C:
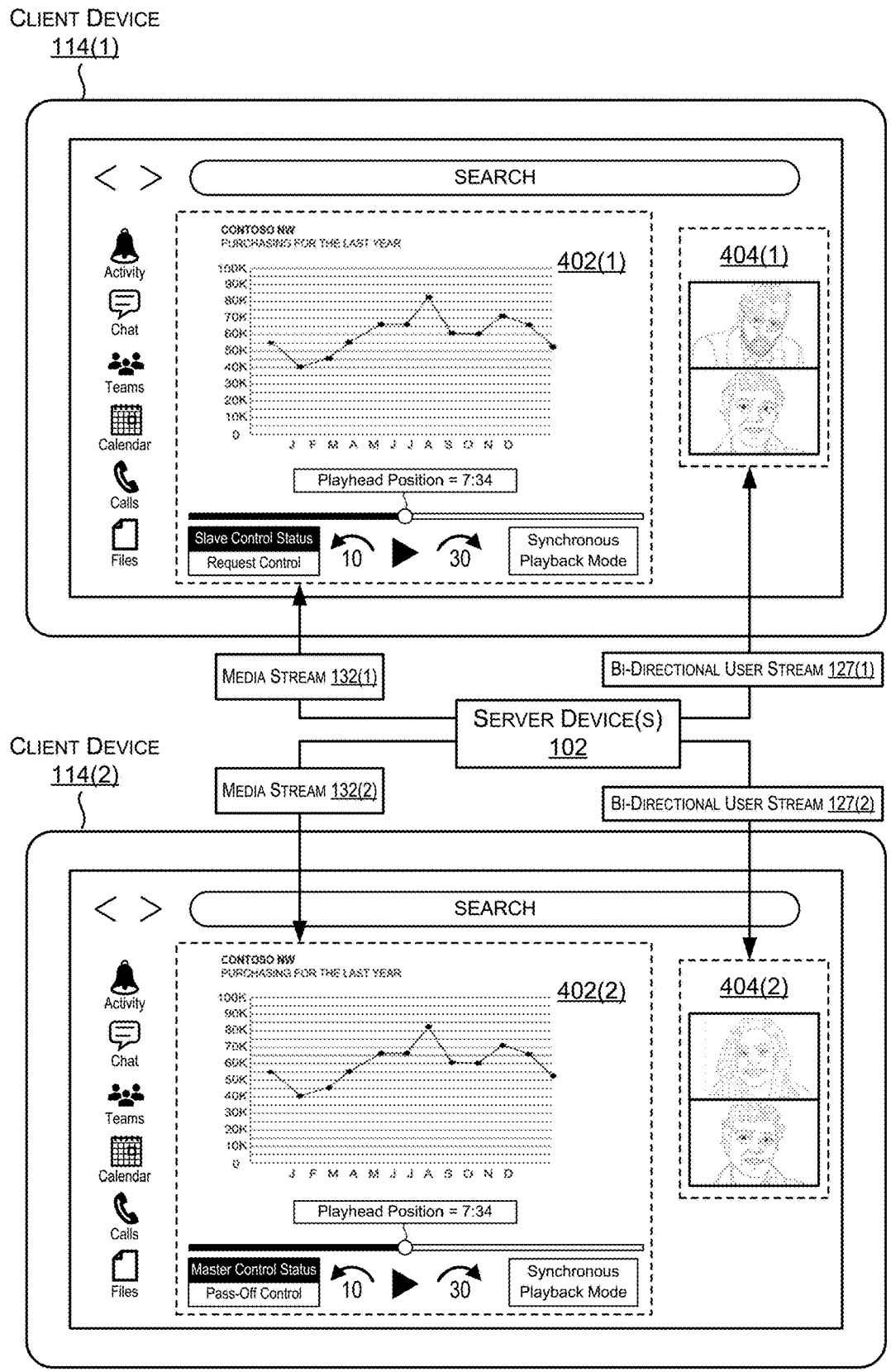
FIG. 4C shows exemplary graphical user interfaces that may be concurrently displayed on two different client devices subsequent to a master control status being passed from a first client device to a second client device.

Furthermore, in some embodiments, the systems and techniques described herein may facilitate passing master control status between individual ones of the client devices. For example, as illustrated in FIG. 4B, the first client device 114(1) is displaying a user control or button which states "Pass-Off Control" and the second client device 114(2) is displaying a user control or button which states "Request Control." Here, by selecting the Pass-Off Control button (and then selecting one or more particular participants) the participant whom currently has the master control status can pass this status on to some other participant as desired. With respect to this point, FIG. 4C shows exemplary graphical user interfaces that may be concurrently displayed on the first client device to the second client device subsequent to the master control status being passed from the first client device to the second client device.

Figure 4D:
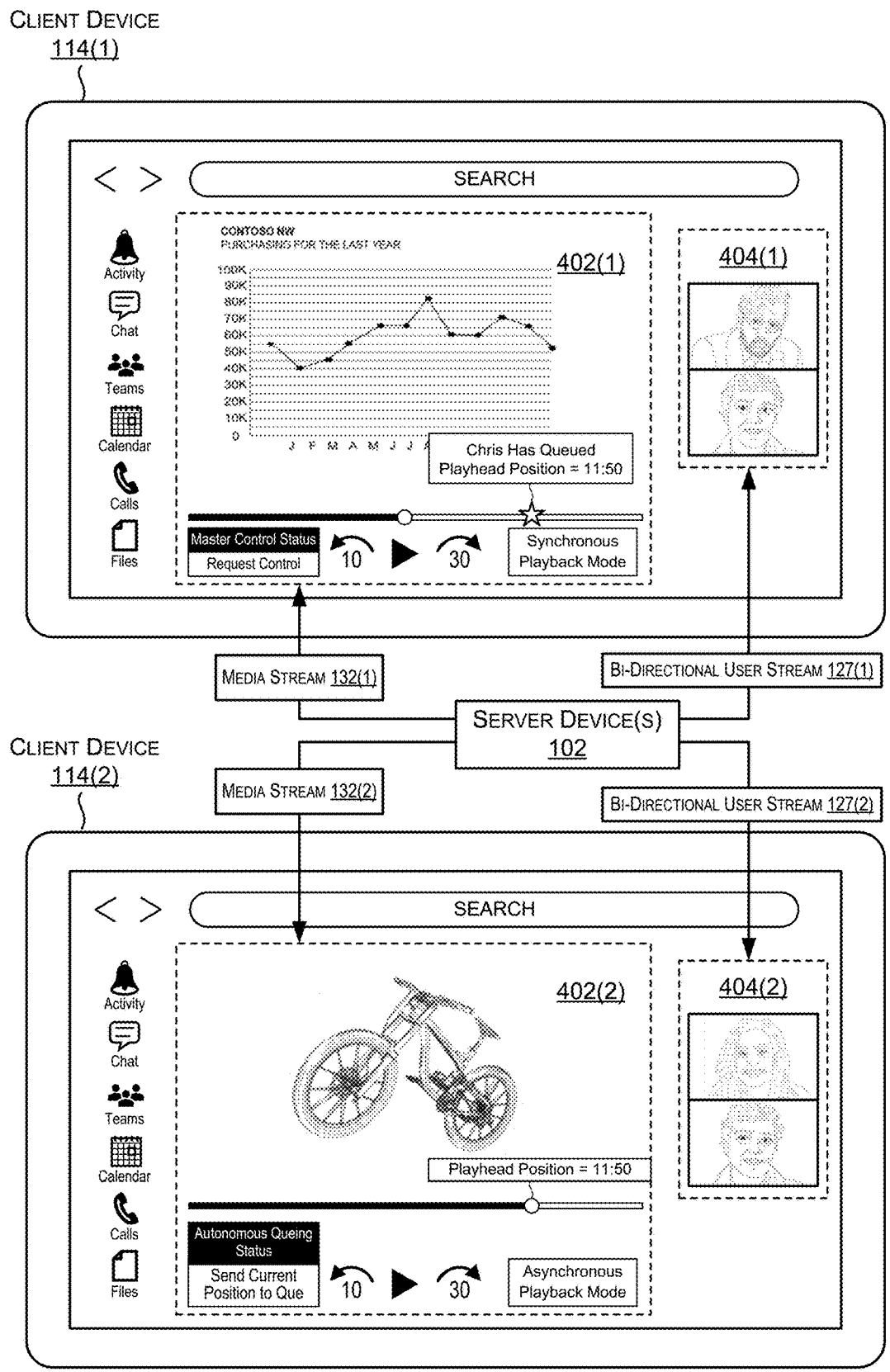
FIG. 4D shows exemplary graphical user interfaces that may be concurrently displayed on two different client devices while one of the devices is operating in an autonomous queuing status.

FIG. 4D shows exemplary graphical user interfaces that may be concurrently displayed on two different client devices while one of the devices is operating in an autonomous queuing status. Specifically, in the illustrated scenario, the first client device 114(1) is operating in the master control status and has selected synchronous playback mode. Thus, as described above, client devices other than the first device 114(1) which are operating in the slave control status may be caused to render whatever playhead position is being currently rendered at the first device 114(1). It can be appreciated that under many circumstances it may be desirable to have various playhead positions queued (e.g., bookmarked) to enable the user of the first device 114(1) (or whichever device is operating in the master control status) to quickly adjust the playhead position without have to manually scroll (e.g., drag) the playhead position indicator. However, there may also be circumstances in which participants may wish to jump to a playhead position for which a que or bookmark does not exist.

Under such circumstances, a second device 114(2) which is not operating in the master control status may be bestowed autonomous queuing status to enable a user of the second device 114(2) to adjust his or her playhead position independently from other device—even while some other devices are operating in slave control status and synchronous playback mode. Then, the user of the second device 114(2) can move the playhead position to some desired point and send that current position to the que at the first device 114(1). For example, as illustrated, the second device 114(2) is rendering a playhead position at 11:50 even through the first device 114(1) is causing other devices operating in slave control status to render some other earlier playhead position. As further illustrated, due to the user of the second device 114(2) adding the playhead position of 11:50 to the que of whichever device is operating in master control status, a bookmark indicator (e.g., which is star-shaped in the illustrated by non-limiting scenario) becomes visible at the playhead position of 11:50 along with a message that "Chris has queued Playhead Position 11:50." Upon the user of the first device 114(1) selecting the bookmark indicator, other devices being used to participate in the conference session may be immediately synchronized to this position. In this way, one or more participants of the communication session may work in the background on the second device 114(2) to manually scroll through the video content and generate on the fly bookmarks that are actionable by the user of the first device 114(1).

Figure 5:
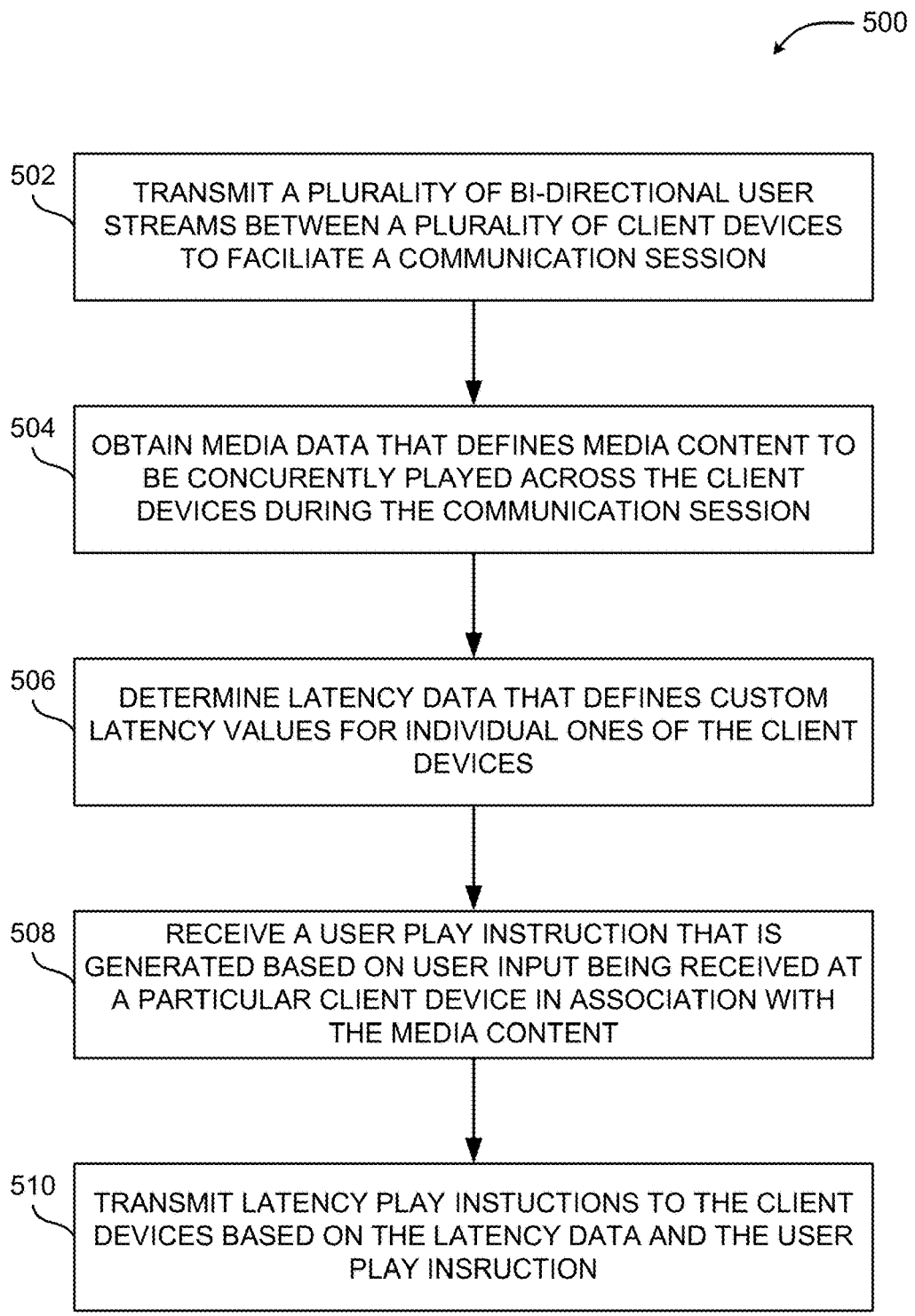
FIG. 5 is a flow diagram for an exemplary process for performing latency compensation techniques to facilitate synchronous sharing of video content across a plurality of client devices during a communication session.

Turning now to FIG. 5, a flow diagram is shown for an exemplary process 500 for performing latency compensation techniques to facilitate synchronous sharing of video content across a plurality of client devices during a communication session. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

At operation 502 of the routine 500, a system transmits a plurality of bi-directional user streams 126 between a plurality of client devices 114 to facilitate a communication session 128. For example, each of the plurality of client devices 114 may capture audio and video "AV" data (e.g., of a user) via various input devices such as cameras and microphones. The captured A/V data may be continuously streamed to one or more server devices 102. Upon receiving the AV data streams from the client devices, the server devices 102 may transmit to each individual client device 114 the streams of A/V data that is received from each other client device 114. In this way, each individual client device 114 is enabled to render live video 404 of the participants utilizing the other client devices 114, thereby facilitating the communication session 128 as a type of virtual meeting or web-based conference. For example, as illustrated in FIGS. 4A and 4B, each of the first client device 114(1) and the second client device 114(2) are rendering streams of live video 404 of other participants of the communication session 128.

At operation 504, the system obtains media data that defines media content to be concurrently played across the client devices during the communication session 128. For example, at some point during the communication session 128 while the client devices 114 are rendering the live video 404 or simply audio streams that are captured at the other participants' client devices 114, the medio content such as a video hosted by server devices 102 may be streamed to and displayed at the client devices 114.

At operation 506, the system determines latency data that defines custom latency values for individual ones of the client devices. Specifically, the latency data defines individual latency values associated with transmitting information to individual client devices. For example, a latency value of 54 milliseconds for a particular client device indicates that it will take 54 milliseconds for information that is sent to that particular client device to be transmitted across one or more networks and, ultimately, to reach that particular client device.

In some embodiments, determining the latency values for individual ones of the client devices includes periodically pinging the individual client devices and measuring an amount of time that it takes for the pings to be returned to (e.g., echoed back to) the sending device from the receiving device. For example, as described in relation to FIGS. 3A through 3B, the system may determine accurate and up-to-date latency values on a per-device basis by deploying a latency monitor 110 which calculates the networking latency associated with individual client devices based on the round-trip time that it takes for the individual pings to reach the client devices and then be returned to the one or more server devices. For example, assuming that each leg of these individual round-trips are equal in time, the latency value associated with any individual client device 114 may be assumed to be the measured round-trip time divided in half.

In some embodiments, the latency monitor 110 may repeatedly calculate and re-calculate the latency values for the individual client devices based on a sequence of latency values that are stored in a Last-In-First-Out (LIFO) Database. For example, the latency monitor 110 may be configured to periodically transmit pings to the individual client devices according to some predefined interval such as, for example, 1 second, 2 seconds, or any other suitable interval of time. Then, as the pings are echoed back to the latency monitor 110 by the individual client devices, the most recently calculated latency values may be added to the LIFO Database while the oldest values may be deleted. In this way, the LIFO Database is usable to maintain a sample of latency values that is both statistically relevant due to being of suitable size (e.g., 5 values, 10 values, etc.) while also being temporally relevant due to being recently calculated, i.e., not stale. In embodiments in which a LIFO Database is maintained with a recent set of latency values for the individual client devices, then the currently latency value used to determine the appropriate latency delay as described above may be a dynamic rolling average of those latency values maintained within the LIFO Database.

In some embodiments, the latency monitor 110 deploys a machine learning engine 112 to perform pattern recognition techniques to determine current latency value that accounts for trends within the latency values determined for any particular client device. For example, under circumstances in which a recent set of latency values for an individual client device reveals a trend of increasing or decreasing latency, then the machine learning engine 112 may adjust the dynamic rolling average upwards or downwards, respectively, to account for the identified trend. As another example, the machine learning engine 112 may perform a browser sniffing operation with respect to the individual client devices to identify a particular web browser that is being used to render the media content. Then, to account for variations in latency with respect to how quickly different types of web browsers are able render media content, the machine learning engine 112 may adjust the dynamic rolling average of the current latency value.

At operation 508, the system receives a user play instruction that is generated based on user input being received at a particular client device 114 for the purpose of initiating playback of the media content across the plurality of client devices 114. For example, a user at the particular client device may select the media data 106 that is stored in association with the meeting data 104 to cause the media content to begin playing at the particular client device. Then, the user may adjust the playhead position of the media content at the particular client device to a desired playhead position before providing user input to cause all of the other client devices to begin playback of the media content at the desired playhead position. In some embodiments, the user play instruction may include an indication of the desired playhead position at which the media content is to begin playing synchronously across all of the client devices 114.

At operation 510, in response to the user play instruction, the system transmits latency play instructions to the client devices based on the latency data. As described above, the manner in which the latency play instructions are transmitted to the client devices may prescribe intentional latency delays on some subset of the client devices to cause playback of the media data to begin synchronously across the plurality of client devices. For example, the individual latency play instructions may include a latency delay value that prescribes an amount of time that the individual client devices are to wait, after receiving the corresponding latency play instruction, before initiating playback of the media content that is obtained via the media streams.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 6:
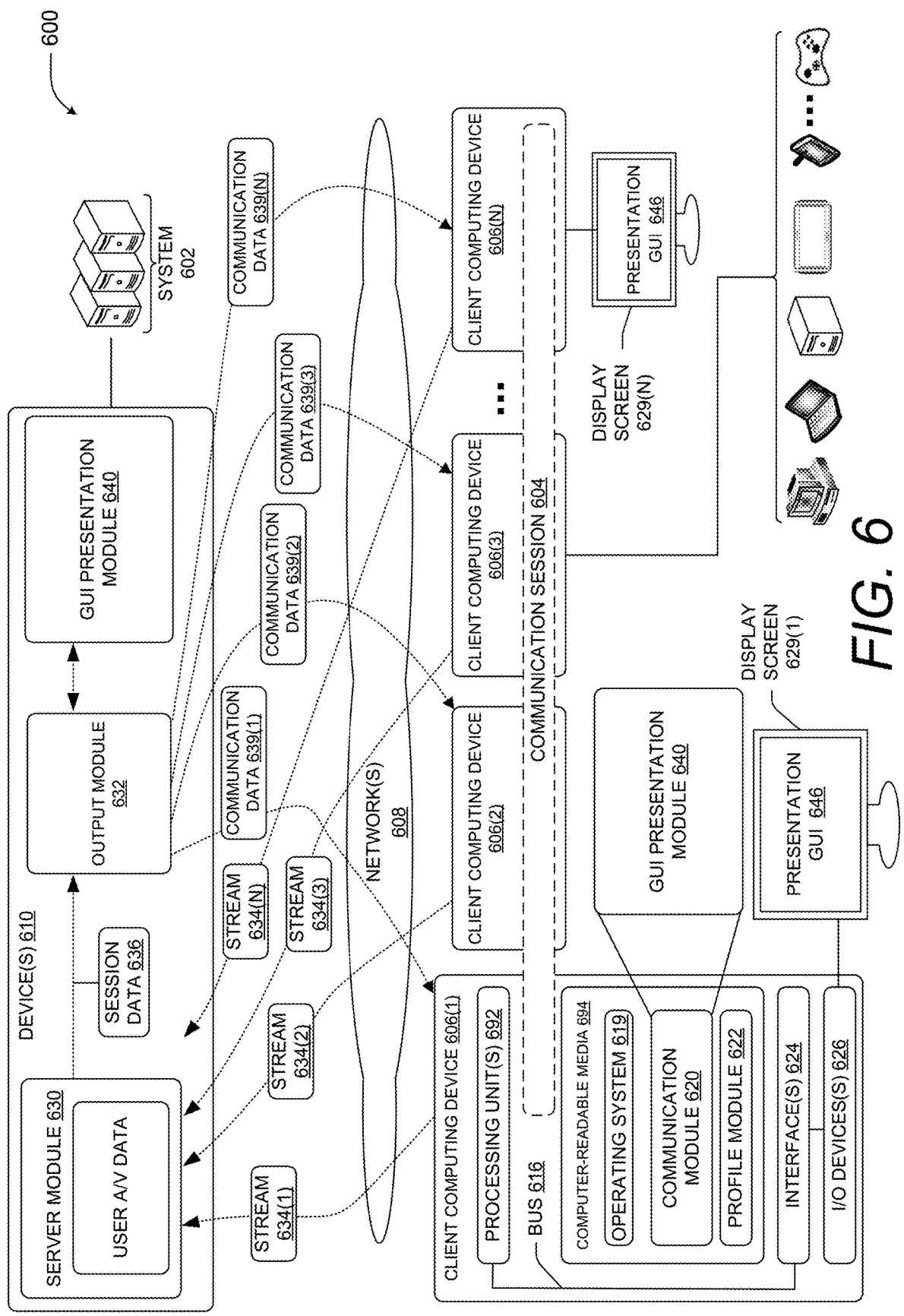
FIG. 6 is a diagram illustrating an example environment 600 in which a system can implement the techniques disclosed herein.

FIG. 6 is a diagram illustrating an example environment 600 in which a system 602 can implement the techniques disclosed herein. In some implementations, a system 602 may function to collect, analyze, and share data defining one or more objects that are displayed to users of a communication session 604.

As illustrated, the communication session 604 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 604.

In this example, the communication session 604 is hosted, over one or more network(s) 608, by the system 602. That is, the system 602 can provide a service that enables users of the client computing devices 606(1) through 606(N) to participate in the communication session 604 (e.g., via a live viewing and/or a recorded viewing). Consequently, a "participant" to the communication session 604 can comprise a user and/or a client computing device (e.g., multiple users may be in a room participating in a communication session via the use of a single client computing device), each of which can communicate with other participants. As an alternative, the communication session 604 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 604. A computing system 602 that collects participant data in the communication session 604 may be able to link to such external communication sessions. Therefore, the system may receive information, such as date, time, session particulars, and the like, that enables connectivity to such external communication sessions. In one example, a chat conversation can be conducted in accordance with the communication session 604. Additionally, the system 602 may host the communication session 604, which includes at least a plurality of participants co-located at a meeting location, such as a meeting room or auditorium, or located in disparate locations.

In examples described herein, client computing devices 606(1) through 606(N) participating in the communication session 604 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise user data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise user data that includes an avatar of a user participating in the communication session along with audio data that captures the speech of the user. Yet another example of an individual stream of live or recorded content can comprise user stream data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 604 live as activity occurs, or alternatively, via a recording at a later time after the activity occurs. In examples described herein, client computing devices 606(1) through 606(N) participating in the communication session 604 are configured to receive and render for display, on a user interface of a display screen, communication data. The communication data can comprise a collection of various instances, or streams, of live and/or recorded content. For example, an individual stream of content can comprise user steam data associated with a video feed (e.g., audio and visual data that capture the appearance and speech of a user participating in the communication session). Another example of an individual stream of content can comprise user stream data that includes an avatar of a user participating in the conference session along with audio data that captures the speech of the user. Yet another example of an individual stream of content can comprise user stream data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 6 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 604. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.7 standards (e.g., 802.7g, 802.7n, 802.7ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a communication module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 606(1) is in some way connected to a display device (e.g., a display screen 629(N)), which can display a UI according to the techniques described herein.

In the example environment 600 of FIG. 6, client computing devices 606(1) through 606(N) may use their respective communication modules 620 to connect with one another and/or other external device(s) in order to participate in the communication session 604, or in order to contribute activity to a collaboration environment. For instance, a first user may utilize a client computing device 606(1) to communicate with a second user of another client computing device 606(2). When executing communication modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 6) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 6, the device(s) 610 of the system 602 include a server module 630 and an output module 632. In this example, the server module 630 is configured to receive, from individual client computing devices such as client computing devices 606(1) through 606(N), streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various streams 634(1) through 634(N) during a live viewing of the communication session 604 (the collection being referred to herein as "user A/V data 634"). In some scenarios, not all of the client computing devices that participate in the communication session 604 provide a media stream. For example, a client computing device may only be a consuming, or a "listening", device such that it only receives content associated with the communication session 604 but does not provide any content to the communication session 604.

In various examples, the server module 630 can select aspects of the streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content associated with the output module 632 and based on received session data 636.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the communication module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 640 rendered on the display screen 629 of the associated client computing device 606. The presentation GUI 640 may be caused to be rendered on the display screen 629 by the GUI presentation module 640. The presentation GUI 1146 may include the video, image, and/or content analyzed by the GUI presentation module 640.

In some implementations, the presentation GUI 640 may include a plurality of sections or grids that may render or comprise video, image, and/or content for display on the display screen 629. For example, a first section of the presentation GUI 640 may include a video feed of a presenter or individual, a second section of the presentation GUI 640 may include a video feed of an individual consuming meeting information provided by the presenter or individual. The GUI presentation module 640 may populate the first and second sections of the presentation GUI 640 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 640 may include a video feed of a plurality of participants associated with a meeting, such as a general communication session. In other implementations, the presentation GUI 640 may be associated with a channel, such as a chat channel, enterprise teams channel, or the like. Therefore, the presentation GUI 640 may be associated with an external communication session that is different than the general communication session.

Figure 7:
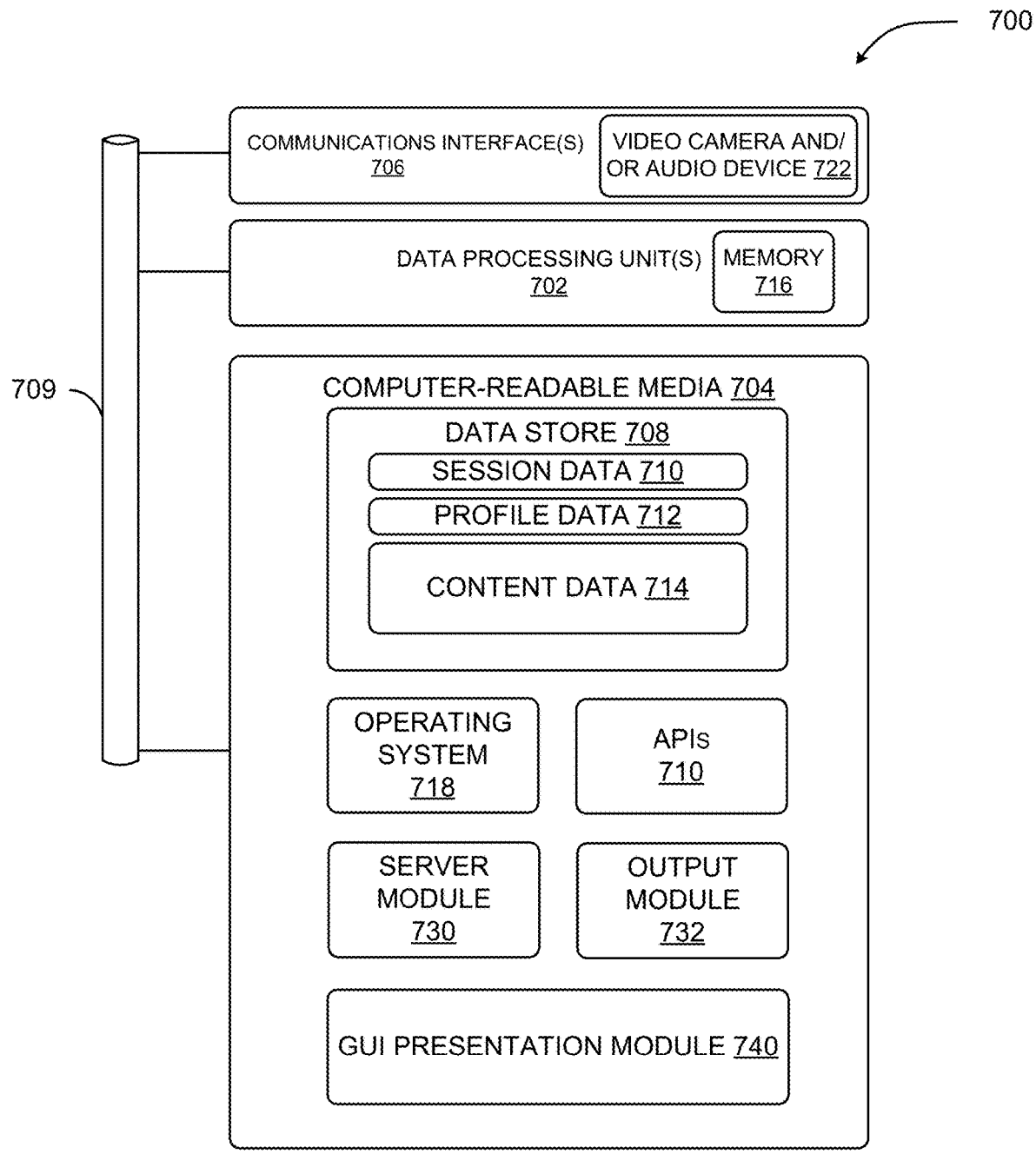
FIG. 7 illustrates a diagram that shows example components of an example device (also referred to herein as a "computing device") configured to generate data for some of the user interfaces disclosed herein.

FIG. 7 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen. The device 700 may represent one of the device(s) described herein. Additionally, or alternatively, the device 700 may represent one of the client computing devices 1106.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 1136 as shown in FIG. 11), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include content data 714, such as the content that includes video, audio, or other content for rendering and display on one or more of the display screens.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary higher or lower. That is, functionality described herein in association with the illustrated modules may be performed by a fewer number of modules or a larger number of modules on one device or spread across multiple devices.

It should also be appreciated that many variations and modifications may be made to the above-described examples, the elements of which are to be understood as being among other acceptable examples. All such modifications and variations are intended to be included herein within the scope of this disclosure and protected by the following claims.

EXAMPLE CLAUSES

Example Clause A, a computer-implemented method, comprising: obtaining media data that defines media content that is to be concurrently played at a plurality of client devices operating in association with a communication session; determining latency data that defines a latency value associated with transmitting signals to each of a plurality of client devices participating the communication session, wherein the latency value associated with each respective client device is determined based on assessing a connection condition to each client device during the communication session; receiving a play instruction to initiate playback of the media content at the plurality of client devices; and responsive to the play instruction, causing the playback of the media content to begin across the plurality of client devices with different built-in latency delays controlled by a latency play instruction provided to each of the client devices, wherein: each latency play instruction corresponds to a respective client device, each latency play instruction defines an amount of latency delay that is determined based on a difference between the latency data corresponding to the respective client device and the latency data corresponding to a client device that corresponds to a largest latency value, the amount of latency delay configured to cause the respective client device to postpone initiating the playback of the media data for the defined amount of latency delay; and at least two latency play instructions define different amounts of latency delay.

Example Clause B, the computer-implemented method of Example Clause A, wherein a first latency delay for a first client device to postpone initiating the playback of the media data is determined based at least in part on a portion of the latency data associated with a second client device.

Example Clause C, the computer-implemented method of any one of Example Clauses A through B, further comprising: receiving a first playback mode command in association with the playback of the media content; responsive to the first playback mode command, enabling individual playhead positions of the playback of the media content to be independently adjusted at the individual client devices; receiving a second playback mode command in association with the playback of the media content, wherein the second playback mode command indicates a particular playhead position; and responsive to the second playback mode command, causing the playback of the media content to be updated to the particular playhead position across the plurality of client devices.

Example Clause D, the computer-implemented method of any one of Example Clauses A through C, wherein the determining the latency data includes: transmitting a plurality of pings to the plurality of client devices during the communication session; and calculating a plurality of latency values based at least in part on a plurality of round-trip times associated with the plurality of pings.

Example Clause E, the computer-implemented method of any one of Example Clauses A through D, wherein the play instructions is a user play instruction that is generated based on user input that is received at a particular one of the plurality of client devices.

Example Clause F, the computer-implemented method of any one of Example Clauses A through E, wherein each latency play instruction defines both: a playhead position that is indicated by the user play instruction that is generated based on the user input received at the particular client device; and individual latency delays that are determined for corresponding ones of the individual client devices based on a portion of the latency data that corresponds to at least one other client device.

Example Clause G, the computer-implemented method of any one of Example Clauses A through F, wherein at least some individual latency play instructions define individual latency delays that cause at least some of the individual client devices to postpone initiating the playback of the media data until each of the plurality of client devices receives a corresponding latency play instruction.

Example Clause H, the computer-implemented method of any one of Example Clauses A through G, wherein individual latency play instructions cause at least some of the individual client devices to begin buffering the media content from one or more media streams that is received independently from one or more bi-directional user streams.

Example Clause I, the computer-implemented method of any one of Example Clauses A through H, further comprising: responsive to determining that the playback of the media content has been paused at a particular playhead position at a first client device, transmitting a pause instruction to a second client device to: cause the playback of the media content to be paused at the second client device, and cause a current playhead position of the media content at the second client device to be updated to the particular playhead position.

Example Clause J, a system, comprising: at least one processor; and at least one memory in communication with the at least one processor, the at least one memory having computer-readable instructions stored thereupon that, when executed by the at least one processor, cause the at least one processor to: transmit a plurality of bi-directional user streams between a plurality of client devices to facilitate a communication session; receive, from a particular client device during the communication session, a user play instruction to initiate playback of hosted media content at the plurality of client devices via a plurality of media streams that are different from the plurality of bi-directional user streams; determine latency data that defines a plurality of latency values associated with transmitting information to individual client devices of the plurality of client devices during the communication session; determine individual latency delays for the individual client devices based on portions of the latency data that correspond to other client devices of the plurality of client devices; and transmit a plurality of latency play instructions to cause the playback of the hosted media content to begin across the plurality of client devices, wherein individual latency play instructions include corresponding ones of the individual latency delays to cause at least some of the individual client devices to postpone initiating the playback of the media data subsequent to receiving the individual latency play instructions.

Example Clause K, the system of Example Clause J, wherein the individual latency play instructions a playhead position that is indicated by the user play instruction.

Example Clause L, the system of any one of Example Clauses J through K, wherein the computer-readable instructions further cause the at least one processor to: responsive to receiving an asynchronous playback mode command from a master client device, enabling individual playhead positions of the playback of the media content to be independently adjusted at the individual client devices.

Example Clause M, the system of any one of Example Clauses J through L, wherein the computer-readable instructions further cause the at least one processor to: responsive to receiving a synchronous playback mode command from a master client device, causing the playback of the media content to be updated, across each of the plurality of client devices, to a particular playhead position that is associated with the master client device.

Example Clause N, the system of any one of Example Clauses J through M, wherein determining the latency data includes: transmitting, during the communication session, a plurality of pings to the plurality of client devices; and calculating the plurality of latency values based on round-trip times associated with individual pings of the plurality of pings.

Example Clause O, the system of any one of Example Clauses J through N, wherein the computer-readable instructions further cause the at least one processor to: receive, from a first client device that corresponds to a master control status, a pass control request that identifies a second client device that corresponds to a slave control status; and responsive to the pass control request, updating permissions data to bestow the master control status to the second client device and the slave control status to the first client device.

Example Clause P, the system of any one of Example Clauses J through O, wherein the individual latency play instructions cause at least some of the individual client devices to begin buffering the hosted media content from one or more media streams that are received independently from the bi-directional user streams.

Example Clause Q, the system of any one of Example Clauses J through P, wherein the computer-readable instructions further cause the at least one processor to: receive, from the particular client device, a pause instruction that indicates a particular playhead position at which the playback of the media content has been paused at the particular client device; and responsive to the pause instructions, causing the playhead position to be updated to and paused at the particular playhead position across the plurality of client devices.

Example Clause R, a system comprising: means for identifying media content to be played at a plurality of client devices operating in association with a communication session; means for determining latency data that defines a plurality of latency values associated with transmitting information to the plurality of client devices during the communication session; means for receiving a play instruction that is generated to initiate playback of the media content at the plurality of client devices; and means for transmitting a plurality of latency play instructions to cause the playback of the media content to begin synchronously across the plurality of client devices, wherein at least some of the individual client devices are caused to postpone initiating the playback of the media data subsequent to receiving at least one corresponding latency play instruction.

Example Clause S, the system of any one of Example Clauses J through L, further comprising: means for receiving a pass control request from a first device that corresponds to a master control status, wherein the pass control request identifies a second client device that corresponds to a slave control status; and means for updating permissions data to provide the master control status to the second client device and the slave control status to the first client device.

Example Clause T, the system of any one of Example Clauses J through S, means for toggling a playback mode associated with the playback of the media data between an asynchronous playback mode and a synchronous playback mode.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
    communicating user stream data among a plurality of client devices operating to facilitate a communication session, wherein an instance of the user stream data provides real-time participation in the communication session for a user;
    receiving, from a particular client device of the plurality of client devices, a sharing instruction to share media data that defines media content that is to be played back across the plurality of client devices during the real-time participation in the communication session;
    obtaining, via the communication session and based on the sharing instruction, the media data that defines the media content that is to be played back across the plurality of client devices during the real-time participation in the communication session, the media data being different than the user stream data;
    determining latency data that defines a latency value associated with transmitting signals to each of the plurality of client devices operating to facilitate the communication session, wherein the latency value associated with each respective client device is determined based on assessing a connection condition to each respective client device during the real-time participation in the communication session;
    receiving, from the particular client device, a play instruction to begin playback of the media content across the plurality of client devices;
    responsive to receiving the play instruction from the particular client device, causing the playback of the media content to begin across the plurality of client devices with different built-in latency delays controlled by a latency play instruction provided to each of the plurality of client devices based on the latency value associated with each respective client device, wherein the playback of the media content across the plurality of client devices is implemented during the real-time participation in the communication session;
    enabling asynchronous consumption of the media content by the plurality of client devices during which individual playhead positions of the playback of the media content are allowed to be independently adjusted at each client device of the plurality of client devices during the real-time participation in the communication of the user stream data among the plurality of client devices operating to facilitate the communication session;
    receiving, from the particular client device, a synchronous playback mode command requiring synchronous consumption of the media content based on a current playhead position of the particular client device; and
    responsive to receiving the synchronous playback mode command from the particular client device, causing the plurality of client devices to toggle from the asynchronous consumption of the media content to the synchronous consumption of the media content by updating the playback of the media content across the plurality of client devices to the current playhead position of the particular client device.

2. The computer-implemented method of claim 1, wherein a first latency delay for a first client device to postpone initiating the playback of the media content is determined based at least in part on the latency value associated with a second client device.

3. The computer-implemented method of claim 1, wherein the determining the latency data includes:
    transmitting a plurality of pings to the plurality of client devices during the communication session; and
    calculating a plurality of latency values based at least in part on a plurality of round-trip times associated with the plurality of pings.

4. The computer-implemented method of claim 1, wherein at least some individual latency play instructions define individual latency delays that cause at least some individual client devices, of the plurality of client devices, to postpone initiating the playback of the media content until each of the plurality of client devices receives a corresponding latency play instruction.

5. The computer-implemented method of claim 1, wherein individual latency play instructions cause at least some of the individual client devices to begin buffering the media content that is received independently from the user stream data.

6. A system, comprising:
at least one processor; and
at least one memory in communication with the at least one processor, the at least one memory having computer-readable instructions stored thereupon that, when executed by the at least one processor, cause the at least one processor to:
transmit a plurality of user streams among a plurality of client devices to facilitate a communication session, wherein an individual user stream provides real-time participation in the communication session for a user;
receive, from a first client device of the plurality of client devices, a sharing instruction to share media content across the plurality of client devices during the real-time participation in the communication session;
bestow primary control status for the media content to the first client device based on the sharing instruction, wherein the primary control status enables control of a playback position of the media content for each of the plurality of client devices;
receive, from the first client device during the real-time participation in the communication session and based on the primary control status, a user play instruction to begin playback of the media content across the plurality of client devices via a plurality of media streams that are different from the plurality of user streams;
determine latency data that defines a plurality of latency values associated with transmitting information to individual client devices of the plurality of client devices during the real-time participation in the communication session;
determine individual latency delays for the individual client devices based on portions of the latency data that correspond to other client devices of the plurality of client devices;
transmit a plurality of latency play instructions to cause the playback of the media content to begin across the plurality of client devices, wherein individual latency play instructions include corresponding ones of the individual latency delays to cause at least some of the individual client devices to postpone initiating the playback of the media content subsequent to receiving the individual latency play instructions;
receive, from the first client device, a pass control request that identifies a second client device; and
responsive to receiving the pass control request, remove the primary control status for the media content from the first client device and bestow the primary control status for the media content to the second client device identified via the pass control request.

7. The system of claim 6, wherein the individual latency play instructions include an initial playhead position that is indicated by the user play instruction.

8. The system of claim 6, wherein determining the latency data includes:
transmitting, during the communication session, a plurality of pings to the plurality of client devices; and
calculating the plurality of latency values based on round-trip times associated with individual pings of the plurality of pings.

9. The system of claim 6, wherein the individual latency play instructions cause at least some of the individual client devices to begin buffering the media content from one or more media streams that are received independently from the plurality of user streams.

10. The system of claim 6, wherein the computer-readable instructions further cause the at least one processor to:
receive, from the first client device, a pause instruction that indicates a particular playhead position at which the playback of the media content has been paused at the first client device; and
responsive to receiving the pause instruction, cause a current playhead position to be updated to and paused at the particular playhead position across the plurality of client devices.

11. A system, comprising:
at least one processor; and
at least one memory in communication with the at least one processor, the at least one memory having computer-readable instructions stored thereupon that, when executed by the at least one processor, cause the at least one processor to:
communicate user stream data among a plurality of client devices operating to facilitate a communication session, wherein an instance of the user stream data provides real-time participation in the communication session for a user;
receive, from a particular client device of the plurality of client devices, a sharing instruction to share media data that defines media content that is to be played back across the plurality of client devices during the real-time participation in the communication session;
obtain, via the communication session and based on the sharing instruction, the media data that defines the media content that is to be played back across the plurality of client devices during the real-time participation in the communication session, the media data being different than the user stream data;
determine latency data that defines a latency value associated with transmitting signals to each of the plurality of client devices operating to facilitate the communication session, wherein the latency value associated with each respective client device is determined based on assessing a connection condition to each respective client device during the real-time participation in the communication session;
receive, from the particular client device, a play instruction to begin playback of the media content across the plurality of client devices;
responsive to receiving the play instruction from the particular client device, cause the playback of the media content to begin across the plurality of client devices with different built-in latency delays controlled by a latency play instruction provided to each of the plurality of client devices based on the latency value associated with each respective client device, wherein the playback of the media content across the plurality of client devices is implemented during the real-time participation in the communication session;

enable asynchronous consumption of the media content by the plurality of client devices during which individual playhead positions of the playback of the media content are allowed to be independently adjusted at each client device of the plurality of client devices during the real-time participation in the communication of the user stream data among the plurality of client devices operating to facilitate the communication session;

receive, from the particular client device, a synchronous playback mode command requiring synchronous consumption of the media content based on a current playhead position of the particular client device; and responsive to receiving the synchronous playback mode command from the particular client device, cause the plurality of client devices to toggle from the asynchronous consumption of the media content to the synchronous consumption of the media content by updating the playback of the media content across the plurality of client devices to the current playhead position of the particular client device.

12. The system of claim 11, wherein the determining the latency data includes:
   transmitting a plurality of pings to the plurality of client devices during the communication session; and
   calculating a plurality of latency values based at least in part on a plurality of round-trip times associated with the plurality of pings.

13. The system of claim 11, wherein at least some individual latency play instructions define individual latency delays that cause at least some individual client devices, of the plurality of client devices, to postpone initiating the playback of the media content until each of the plurality of client devices receives a corresponding latency play instruction.

14. The system of claim 11, wherein individual latency play instructions cause at least some of the individual client devices to begin buffering the media content that is received independently from the user stream data.

* * * * *